US011790569B2

(12) United States Patent
Nepveu et al.

(10) Patent No.: US 11,790,569 B2
(45) Date of Patent: Oct. 17, 2023

(54) INSERTING IMAGERY FROM A REAL ENVIRONMENT INTO A VIRTUAL ENVIRONMENT

(71) Applicant: Apple Inc., Cupertino, CA (US)

(72) Inventors: Bertrand Nepveu, Los Altos, CA (US); Sandy J. Carter, Utrecht (NL); Vincent Chapdelaine-Couture, Carignan (CA); Marc-Andre Chenier, St-Hyacinthe (CA); Yan Cote, Notre-Dame-de-l'ile-Perrot (CA); Simon Fortin-Deschênes, Sunnyvale, CA (US); Anthony Ghannoum, Santa Clara, CA (US); Tomlinson Holman, Cupertino, CA (US); Marc-Olivier Lepage, Montreal (CA); Yves Millette, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/272,251

(22) PCT Filed: Sep. 6, 2019

(86) PCT No.: PCT/US2019/050008
§ 371 (c)(1),
(2) Date: Feb. 26, 2021

(87) PCT Pub. No.: WO2020/051490
PCT Pub. Date: Mar. 12, 2020

(65) Prior Publication Data
US 2021/0192802 A1 Jun. 24, 2021

Related U.S. Application Data

(60) Provisional application No. 62/892,870, filed on Aug. 28, 2019, provisional application No. 62/729,154,
(Continued)

(51) Int. Cl.
G06T 11/00 (2006.01)
G06F 3/16 (2006.01)
(Continued)

(52) U.S. Cl.
CPC .......... *G06T 11/00* (2013.01); *G02B 27/0179* (2013.01); *G06F 3/011* (2013.01);
(Continued)

(58) Field of Classification Search
CPC ....... G06T 11/00; G06T 19/006; G06F 3/165; G06F 3/011
See application file for complete search history.

(56) References Cited

U.S. PATENT DOCUMENTS 9,223,408 B2  12/2015  Mcardle et al.
9,741,169 B1   8/2017  Holz
(Continued)

FOREIGN PATENT DOCUMENTS

CA  3039347 A1  4/2018
EP  3281058 A1  2/2018
(Continued)

OTHER PUBLICATIONS

Sweetwater, "Crossfade", https://www.sweetwater.com/insync/crossfade/, Oct. 29, 1997. (Year: 1997).*
(Continued)

*Primary Examiner* — Michelle L Sams
(74) *Attorney, Agent, or Firm* — DLA Piper LLP (US)

(57) ABSTRACT

The present disclosure relates to techniques for inserting imagery from a real environment into a virtual environment. While presenting (e.g., displaying) the virtual environment at an electronic device, a proximity of the electronic device to a physical object located in a real environment is detected. In response to detecting that the proximity of the electronic device to the physical object is less than a first threshold
(Continued)

distance, imagery of the physical object is isolated from other imagery of the real environment. The isolated imagery of the physical object is inserted into the virtual environment at a location corresponding to the location of the physical object in the real environment. The imagery of the physical object has a first visibility value associated with the proximity of the electronic device to the physical object.

23 Claims, 15 Drawing Sheets

Related U.S. Application Data filed on Sep. 10, 2018, provisional application No. 62/728,610, filed on Sep. 7, 2018.

(51) Int. Cl.
*H04N 13/117* (2018.01)
*H04N 13/156* (2018.01)
*H04N 13/194* (2018.01)
*G02B 27/01* (2006.01)
*G06F 3/01* (2006.01)

(52) U.S. Cl.
CPC ........... *G06F 3/165* (2013.01); *H04N 13/117* (2018.05); *H04N 13/156* (2018.05); *H04N 13/194* (2018.05); *G02B 2027/0138* (2013.01)

(56) References Cited

U.S. PATENT DOCUMENTS

| | | | |
|---|---|---|---|
| 9,826,299 | B1 | 11/2017 | Osterhout et al. |
| 10,127,290 | B1 | 11/2018 | Armstrong et al. |
| 10,339,721 | B1 | 7/2019 | Dascola et al. |
| 10,409,363 | B1 | 9/2019 | Kudirka et al. |
| 2002/0190989 | A1* | 12/2002 | Kamata .................. G06T 15/40 345/440 |
| 2006/0105838 | A1* | 5/2006 | Mullen ................... A63F 13/65 463/31 |
| 2010/0005406 | A1 | 1/2010 | Hathaway et al. |
| 2012/0058801 | A1 | 3/2012 | Nurmi |
| 2012/0154425 | A1* | 6/2012 | Kim ....................... A63F 13/65 345/592 |
| 2013/0328927 | A1* | 12/2013 | Mount .................... A63F 13/25 345/633 |
| 2014/0364212 | A1 | 12/2014 | Osman et al. |
| 2016/0062121 | A1 | 3/2016 | Border et al. |
| 2016/0247306 | A1* | 8/2016 | Jang ...................... G09G 3/3406 |
| 2016/0260261 | A1 | 9/2016 | Hsu |
| 2016/0260441 | A1 | 9/2016 | Muehlhausen et al. |
| 2016/0313790 | A1 | 10/2016 | Clement et al. |
| 2017/0256083 | A1* | 9/2017 | Ikeuchi .................. H04N 5/225 |
| 2017/0294030 | A1 | 10/2017 | Coglitore |
| 2018/0005441 | A1 | 1/2018 | Anderson |
| 2018/0012074 | A1 | 1/2018 | Holz et al. |
| 2018/0053351 | A1 | 2/2018 | Anderson |
| 2018/0130260 | A1 | 5/2018 | Schmirler et al. |
| 2019/0064919 | A1 | 2/2019 | Bastide et al. |
| 2019/0134487 | A1 | 5/2019 | Kudirka et al. |
| 2019/0146219 | A1 | 5/2019 | Rodriguez, II |
| 2020/0211295 | A1 | 7/2020 | Skidmore |
| 2020/0286301 | A1 | 9/2020 | Loper et al. |
| 2021/0102820 | A1 | 4/2021 | Le et al. |
| 2021/0174601 | A1 | 6/2021 | Ohashi et al. |
| 2021/0352255 | A1 | 11/2021 | Nepveu et al. |

FOREIGN PATENT DOCUMENTS

| | | |
|---|---|---|
| JP | 2018-205828 A | 12/2018 |
| TW | I601054 B | 10/2017 |

OTHER PUBLICATIONS

International Preliminary Report on Patentability received for PCT Patent Application No. PCT/US2019/050008, dated Mar. 18, 2021, 11 pages.
International Preliminary Report on Patentability received for PCT Patent Application No. PCT/US2019/050032, dated Mar. 18, 2021, 17 pages.
International Search Report and Written Opinion received for PCT Patent Application No. PCT/US2019/050008, dated Jan. 7, 2020, 13 pages.
International Search Report and Written Opinion received for PCT Patent Application No. PCT/US2019/050032, dated May 18, 2020, 21 pages.
Invitation to Pay Addition Fees received for PCT Patent Application No. PCT/US2019/050032, dated Jan. 7, 2020, 13 pages.
Office Action received for Indian Patent Application No. 202117008387, dated Feb. 3, 2022, 11 pages.

* cited by examiner

INSERTING IMAGERY FROM A REAL ENVIRONMENT INTO A VIRTUAL ENVIRONMENT

CROSS-REFERENCE TO RELATED APPLICATIONS

This application is a U.S. National Stage patent application of PCT/US2019/050008, entitled "INSERTING IMAGERY FROM A REAL ENVIRONMENT INTO A VIRTUAL ENVIRONMENT," filed on Sep. 6, 2019, which claims the benefit of U.S. Provisional Patent Application No. 62/728,610, entitled "TRANSITIONING BETWEEN IMAGERY AND SOUNDS OF A VIRTUAL ENVIRONMENT AND A REAL ENVIRONMENT," filed on Sep. 7, 2018, U.S. Provisional Patent Application No. 62/729,154, entitled "INSERTING IMAGERY FROM A REAL ENVIRONMENT INTO A VIRTUAL ENVIRONMENT," filed on Sep. 10, 2018, and U.S. Provisional Patent Application No. 62/892,870, entitled "TRANSITIONING BETWEEN IMAGERY AND SOUNDS OF A VIRTUAL ENVIRONMENT AND A REAL ENVIRONMENT," filed on Aug. 28, 2019, which are hereby incorporated by reference in their entireties.

FIELD

This application relates generally to virtual environments, and more specifically to techniques for inserting imagery from a real environment into a virtual environment.

BACKGROUND

Computers can completely project or partially superimpose computer-generated images on a user's view to provide a virtual environment that can be experienced by the user. A virtual environment can be based on different types of realities. An electronic device optionally detects the user's real movements and projects and simulates those movements within a series of visual images or video of the virtual environment. Through these movements projected or simulated within the virtual environment, the user can appear to move to different locations within the virtual environment.

BRIEF SUMMARY

The present disclosure describes techniques for inserting imagery from a real environment into a virtual environment. The imagery from the real environment is inserted in response to an electronic device detecting that a user (and/or the device) is approaching a physical object in the real environment. Imagery of the physical object is then isolated and inserted into the virtual environment. These techniques, as described herein, provide the user with an enhanced degree of safety by, in some exemplary embodiments, providing imagery of the physical object before the user comes into contact with the physical object.

In accordance with some embodiments, a method is described. The method includes: at an electronic device having one or more displays: presenting, using the one or more displays, a virtual environment; detecting a proximity of the electronic device to a physical object located in a real environment; in response to detecting that the proximity of the electronic device to the physical object is less than a first threshold distance: isolating imagery of the physical object from other imagery of the real environment; presenting the virtual environment with the isolated imagery of the physical object inserted into the virtual environment at a location corresponding to the location of the physical object in the real environment, the imagery of the physical object having a first visibility value associated with the proximity of the electronic device to the physical object; and in response to detecting that the proximity of the electronic device to the physical object is greater than the first threshold distance: presenting the virtual environment without the isolated imagery of the physical object.

In some embodiments, the method further includes: in response to detecting that the proximity of the electronic device to the physical object is less than the first threshold distance: displaying the virtual environment at a second visibility value associated with the proximity of the electronic device to the physical object. In some embodiments, the method further includes: in response to detecting that the proximity of the electronic device to the physical object is less than a second threshold distance: modifying the first visibility value of the imagery of the physical object. In some embodiments, the method further includes: in response to detecting that the proximity of the electronic device to the physical object is less than a third threshold distance: ceasing to present the virtual environment; and providing a view of the real environment.

In some embodiments, presenting the virtual environment with the isolated imagery of the physical object includes compositing imagery of the virtual environment with the isolated imagery of the physical object. In some embodiments, compositing uses alpha channels associated with the imagery of the virtual environment and the imagery of the physical object. In some embodiments, presenting the virtual environment with the isolated imagery of the physical object includes aligning a user perspective of the physical object with a user perspective of the virtual environment.

In some embodiments, the method further includes: providing, using one or more speakers, virtual environment audio associated with the virtual environment; and in response to detecting that the proximity of the electronic device to the physical object is less than the first threshold distance: providing a combined mix of the virtual environment audio with real environment audio, wherein an amount of virtual environment audio in the combined mix is associated with the proximity of the electronic device to the physical object. In some embodiments, the virtual environment audio comprises a plurality of audio objects, and wherein providing the combined mix comprises cross-fading the plurality of audio objects with the real environment audio. In some embodiments, an amount of cross-fade applied to one or more first audio objects of the plurality of audio objects is associated with a prominence of the one or more first audio objects in the virtual environment.

In some embodiments, presenting the virtual environment with the isolated imagery of the physical object includes compositing imagery of the virtual environment with the isolated imagery of the physical object using alpha channels associated with the imagery of the virtual environment and the isolated imagery of the physical object, and the amount of cross-fade applied to one or more second audio objects of the plurality of audio objects is associated with values of respective alpha channels.

In accordance with some embodiments, a non-transitory computer-readable storage medium storing one or more programs configured to be executed by one or more processors of an electronic device is described. The one or more programs include instructions for: presenting, using the one or more displays, a virtual environment; detecting a proximity of the electronic device to a physical object located in a real environment; in response to detecting that the proximity of the electronic device to the physical object is less than a first threshold distance: isolating imagery of the physical object from other imagery of the real environment; and presenting the virtual environment with the isolated imagery of the physical object inserted into the virtual environment at a location corresponding to the location of the physical object in the real environment, the imagery of the physical object having a first visibility value associated with the proximity of the electronic device to the physical object; and in response to detecting that the proximity of the electronic device to the physical object is greater than the first threshold distance: presenting the virtual environment without the isolated imagery of the physical object.

In accordance with some embodiments, a transitory computer-readable storage medium storing one or more programs configured to be executed by one or more processors of an electronic device is described. The one or more programs include instructions for: presenting, using the one or more displays, a virtual environment; detecting a proximity of the electronic device to a physical object located in a real environment; in response to detecting that the proximity of the electronic device to the physical object is less than a first threshold distance: isolating imagery of the physical object from other imagery of the real environment; presenting the virtual environment with the isolated imagery of the physical object inserted into the virtual environment at a location corresponding to the location of the physical object in the real environment, the imagery of the physical object having a first visibility value associated with the proximity of the electronic device to the physical object; and in response to detecting that the proximity of the electronic device to the physical object is greater than the first threshold distance: presenting the virtual environment without the isolated imagery of the physical object.

In accordance with some embodiments, an electronic device comprising one or more processors and memory storing one or more programs configured to be executed by the one or more processors is described. The one or more programs include instructions for: presenting, using the one or more displays, a virtual environment; detecting a proximity of the electronic device to a physical object located in a real environment; in response to detecting that the proximity of the electronic device to the physical object is less than a first threshold distance: isolating imagery of the physical object from other imagery of the real environment; presenting the virtual environment with the isolated imagery of the physical object inserted into the virtual environment at a location corresponding to the location of the physical object in the real environment, the imagery of the physical object having a first visibility value associated with the proximity of the electronic device to the physical object; and in response to detecting that the proximity of the electronic device to the physical object is greater than the first threshold distance: presenting the virtual environment without the isolated imagery of the physical object.

In accordance with some embodiments, an electronic device is described. The electronic device includes means for presenting a virtual environment; means for detecting a proximity of the electronic device to a physical object located in a real environment; means for, in response to detecting that the proximity of the electronic device to the physical object is less than a first threshold distance: isolating imagery of the physical object from other imagery of the real environment; presenting the virtual environment with the isolated imagery of the physical object inserted into the virtual environment at a location corresponding to the location of the physical object in the real environment, the imagery of the physical object having a first visibility value associated with the proximity of the electronic device to the physical object; and means for, in response to detecting that the proximity of the electronic device to the physical object is greater than the first threshold distance: presenting the virtual environment without the isolated imagery of the physical object.

Figure 1A:
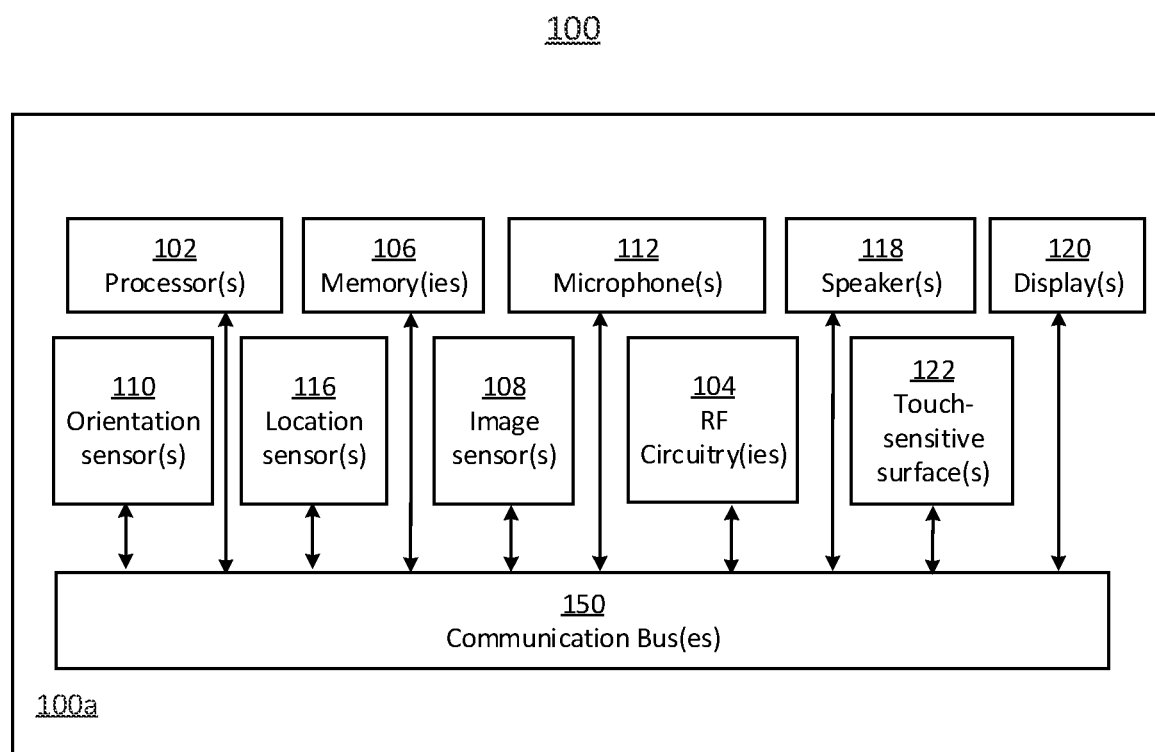
FIGS. 1A-1B depict exemplary systems for use in various enhanced reality technologies.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

Various examples of electronic systems and techniques for using such systems in relation to various enhanced reality technologies are described.

A physical setting (also referred to as a real environment) refers to a world with which various persons can sense and/or interact without use of electronic systems. Physical settings, such as a physical park, include physical elements (also referred to as physical objects), such as, for example, physical wildlife, physical trees, and physical plants. Persons can directly sense and/or otherwise interact with the physical setting, for example, using one or more senses including sight, smell, touch, taste, and hearing.

An enhanced reality (ER) setting (also referred to as a virtual environment), in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figure 1B:
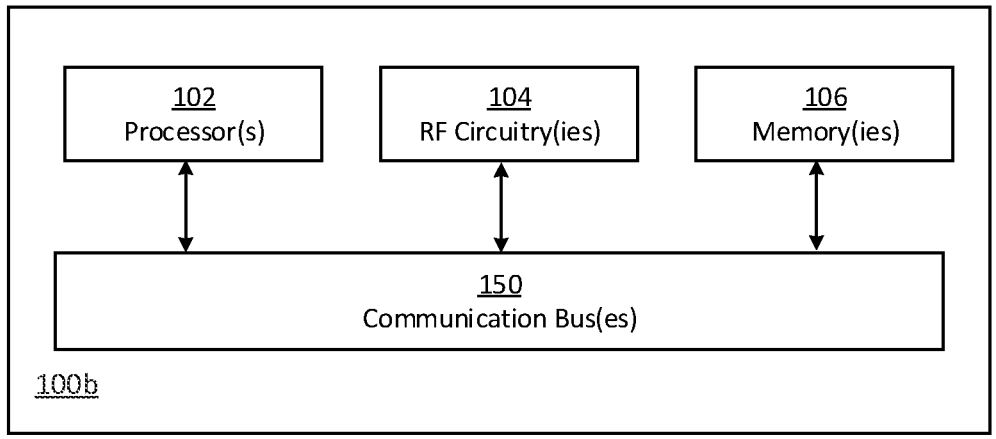
Figure 1B:
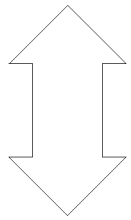
Figure 1B:
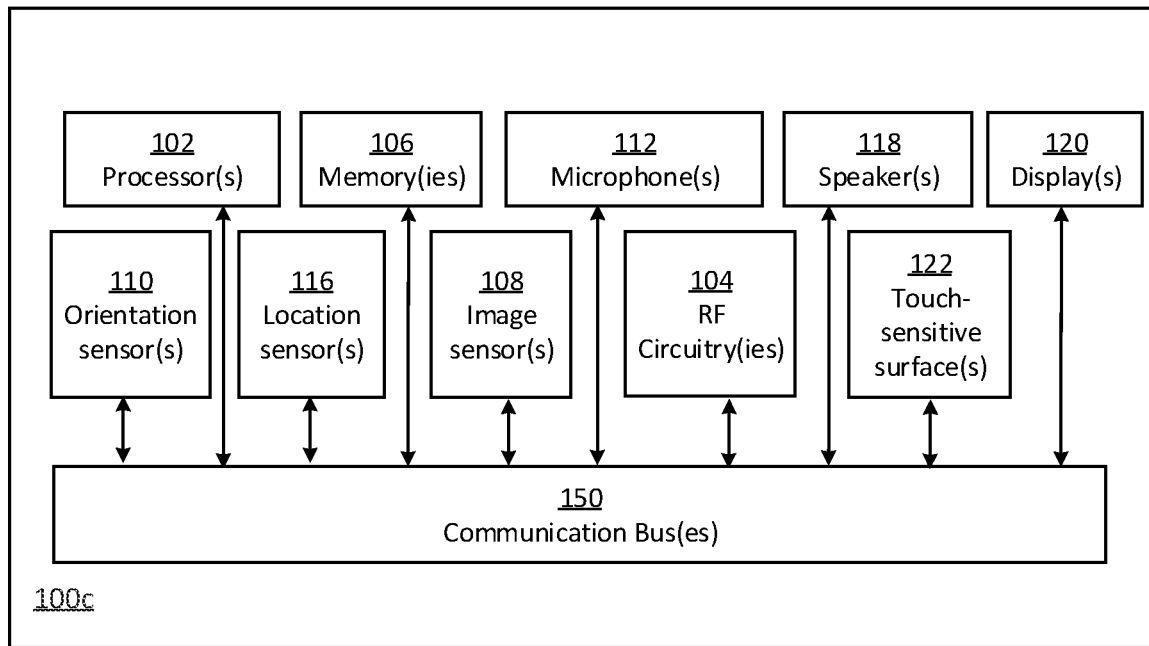

FIG. 1A and FIG. 1B depict exemplary system 100 for use in various enhanced reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

With reference now to FIGS. 2, 3, 4A-4E, 5A-5C, 6, 7, and 8, exemplary techniques for transitioning between imagery and sounds of a virtual environment and imagery and sounds of a real environment are described, as well as techniques for inserting imagery from a real environment into a virtual environment. The transition and/or insertion occurs, in some examples, in response to an electronic device detecting an event, such as a signal from an input device, proximity to a physical object (also referred to as a physical element), and/or a triggering sound. The techniques enhance user convenience and provide the user with an enhanced degree of awareness by, in some exemplary embodiments, providing imagery and sounds of the real environment at a user's request and/or in response to an obstacle or alert in the real environment.

Figure 2:
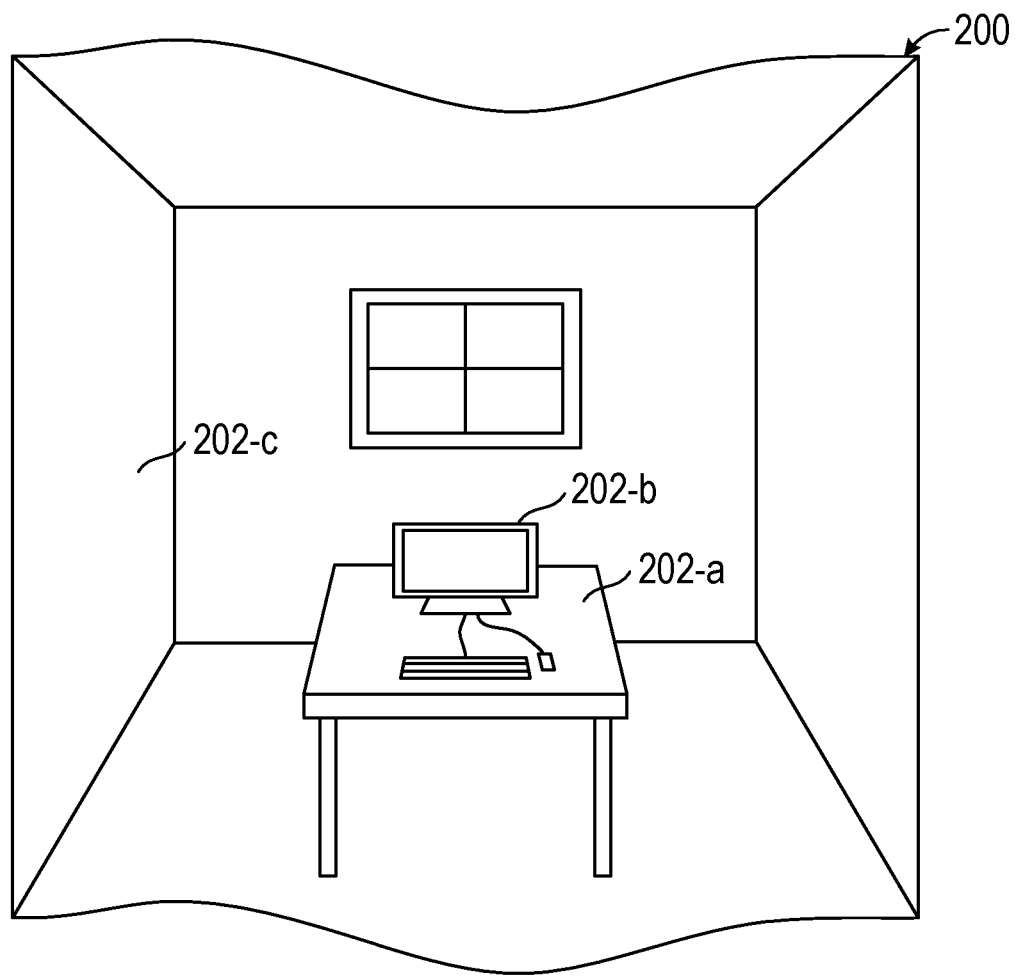
FIG. 2 illustrates an example of a real environment where a virtual environment is to be viewed, in accordance with some embodiments.

FIG. 2 illustrates an example of a real environment 200 (also referred to as a physical setting) where a virtual environment (also referred to as an ER setting) is to be viewed, in accordance with some embodiments. Real environment 200 includes physical objects 202 (also referred to as physical elements), such as table 202-a, computer 202-b, and walls 202-c. While real environment 200 is shown as a room having physical objects 202 in FIG. 2, it should be understood that real environment 200 can be any real-world location where a virtual environment is to be viewed.

Real environment 200 is visible to a user of device 100a, as described in reference to FIGS. 1A-1B. In some embodiments, real environment 200 is displayed to the user by way of a video pass-through mode of device 100a. In other embodiments, the user is provided a substantially direct view of real environment 200, such as with a heads-up display.

Figure 3:
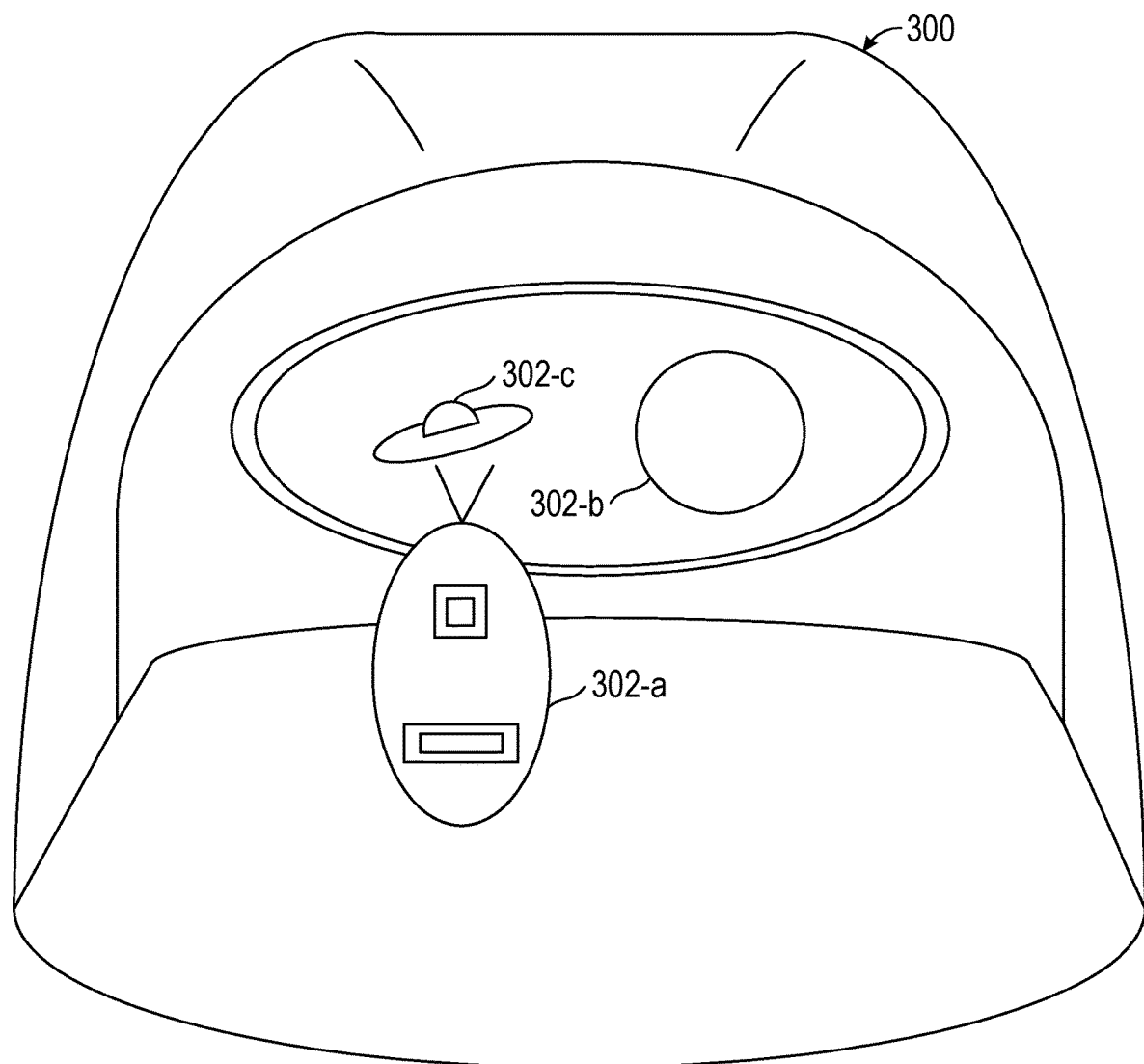
FIG. 3 illustrates an example of a virtual environment, in accordance with some embodiments.

FIG. 3 illustrates an example of a virtual environment 300 (also referred to as an ER setting), in accordance with some embodiments. Virtual environment 300 includes virtual objects 302, such as virtual robot 302-a, virtual planet 302-b, and virtual spaceship 302-c. While virtual environment 300 is shown as a deck of a spaceship in FIG. 3, it should be understood that virtual environment 300 can be any environment where one or more virtual objects are displayed.

In some examples, during operation, device 100a (as described in reference to FIGS. 1A-1B) displays virtual environment 300 to a user of device 100a using display(s) 120. Device 100a also provides audio associated with virtual environment 300 to the user using speaker(s) 118. The virtual environment audio includes one or more audio objects associated with individual components of virtual environment 300. For example, first audio object(s) may be associated with virtual robot 302-a (e.g., vocalizations, beeping, etc.), second audio object(s) may be associated with virtual spaceship 302-c (e.g., engine sounds, alarms, etc.), and third audio object(s) may be associated with the ambient noise of virtual environment 300 (e.g., engine sounds, beeping, etc.). Each of the audio objects are mixed together to form the virtual environment audio. In some embodiments, mixing the audio objects includes adjusting the volume level, spatial placement, and/or frequency spectrum of each audio object such that each audio object is blended into the virtual environment audio. In some embodiments, the volume level, spatial placement, and/or frequency spectrum of each audio object is adjusted based on the location of an associated virtual object 302 in the virtual environment 300 and the location and orientation of the user's head relative to the virtual object 302. In this way, when the user hears the virtual environment audio, the sounds corresponding to each audio object appear to be emitting from the virtual location of the associated virtual object 302 in the virtual environment.

While virtual environment 300 is displayed and virtual environment audio is provided, device 100a detects movement of the user, including detecting a location of the user within real environment 200 and an orientation of the user's head (e.g., where the user is looking). As the user moves, the view of virtual environment 300 changes to correspond to the current location and direction of sight of the user. In addition, the mix of audio objects being provided changes to correspond to the current location and position of the user's ears. For example, the volume level, spatial placement, and/or frequency spectrum or each audio object changes such that the sounds appear to be emitting from a consistent virtual location as the user's location and/or position changes.

Figure 4A:
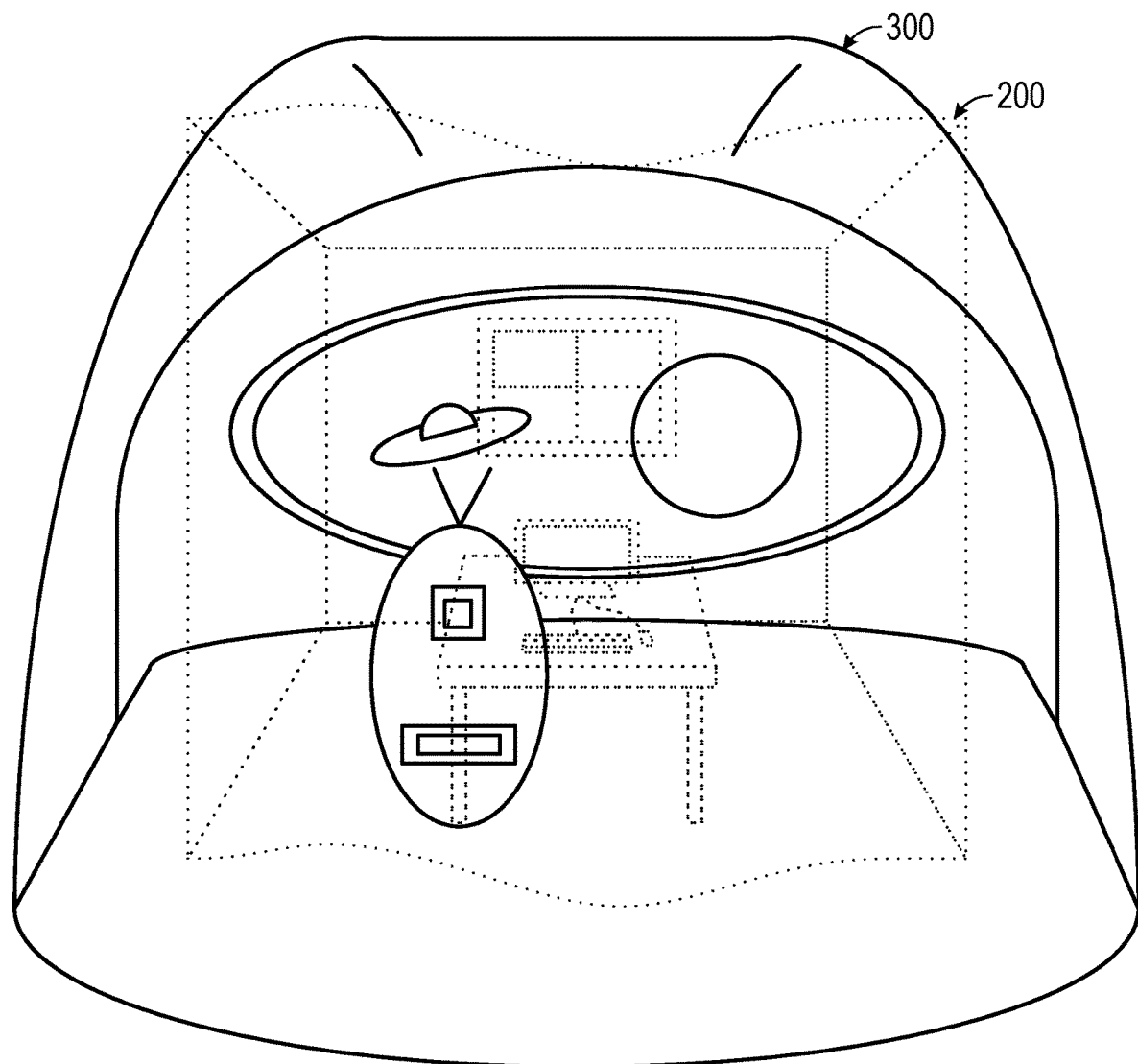
FIGS. 4A-4E illustrate an exemplary technique for transitioning between a virtual environment and a real environment, in accordance with some embodiments.

FIGS. 4A-4E illustrate an exemplary technique for transitioning between virtual environment 300 (as described in reference to FIG. 3) and real environment 200 (as described in reference to FIG. 2), in accordance with some embodiments. As shown in FIG. 4A, a view of virtual environment 300 begins to transition to a view of real environment 200. When the transition begins, the view of real environment 200 is at least partially visible at the same time that a view of virtual environment 300 is provided (e.g., real environment 200 and virtual environment 300 are overlaid on one another). In addition, in some embodiments, audio from the real environment is at least partially audible when the view of real environment 200 becomes at least partially visible.

When transitioning from the view of virtual environment 300 to the view of real environment 200, imagery of virtual environment 300 is composited (e.g., blended) with imagery of real environment 200. The compositing is performed by using visibility values associated with the imagery of each environment to combine the environments with each other. In some embodiments, the visibility values correspond to alpha channel information in the imagery of each environment. The visibility values are used to adjust the transparency of each environment. Before the transition, the virtual environment 300 has no transparency (e.g., alpha=1.0). As the transition begins (such as shown in FIG. 4A), the transparency of the virtual environment 300 is increased (e.g., alpha=0.9), and imagery of the real environment 200 is added to partially transparent imagery of the virtual environment 300, where the real environment 200 has a complementary visibility value (e.g., alpha=0.1).

In some embodiments, the compositing is performed using different visibility values for different virtual objects in the virtual environment 300. For example, as a transition begins, a first virtual object (e.g., virtual robot 302-a) has a first visibility value (e.g., alpha=0.8) while a second virtual object (e.g., virtual spaceship 302-c) has a second, different visibility value (e.g., alpha=0.9). These virtual objects are added to imagery of real environment 200, where overlapping portions of the imagery of real environment 200 have complementary visibility values (e.g., alpha=0.2 and alpha=0.1, respectively). This allows different portions of the virtual environment 300 to fade in or out faster or slower than other portions of the virtual environment 300. In some embodiments, the visibility values correspond to alpha channel information of individual pixels of the virtual environment 300 and the real environment 200.

In some embodiment, the compositing is performed using different visibility values for different objects in the real environment 200. For example, the objects defining the outlines of the real environment 200 (e.g., floor, walls, ceiling, windows, desks) may fade in faster than other objects in the real environment 200 (e.g., objects on the desk, artwork on the walls).

In some embodiments, when the views of virtual environment 300 and real environment 200 are combined, the perspective from which the user sees one or both of the environments is shifted. For example, when the view of real environment 200 is provided using camera(s) that pass-through the imagery of real environment, the perspective provided by the camera(s) may be different than the perspective from which the user sees virtual environment 300 (e.g., the camera(s)'s perspective is two inches in front of the user's eyes). Thus, device 100a shifts the perspective of either the real environment 200 or the virtual environment 300 so that the two environments align. For example, device 100a modifies the imagery of real environment 200 such that the apparent perspective from which the user views the real environment 200 aligns with the perspective of the virtual environment 300 (e.g., the perspective of the real environment 200 is shifted back two inches). Alternatively, in some examples, device 100a shifts the perspective of the virtual environment 300 such that the perspective of the virtual environment 300 aligns with the perspective of the camera(s) capturing the real environment 200 (e.g., the perspective of the virtual environment 300 is shifted forward two inches).

In some embodiments, volume levels of the audio objects associated with virtual objects 302 in virtual environment 300 change as the view of virtual environment 300 transitions to the view of real environment 200. In some embodiments, the volume level of certain audio objects change at a different rate than other audio objects. For example, the volume level of prominent audio object(s) (e.g., audio associated with a main character, such as virtual robot 302-a) may be reduced more quickly than the volume level of audio object(s) used for ambient background noise, or vice versa.

In some embodiments, the volume levels of the audio objects are associated with visibility values of the virtual and real environments. Thus, when virtual environment 300 becomes less visible, the volume level of audio objects associated with virtual environment 300 decrease a corresponding amount. For example, as the visibility value of virtual environment 300 is decreased (e.g., alpha changes from 1.0 to 0.9), the volume levels of the audio objects associated with virtual environment 300 also decrease (e.g., −6 dB). The association between the volume levels of the audio objects and the visibility values of the virtual and real environments can use various algorithms. In the example above, a 10% change in visibility value corresponds to a 6 dB decrease in volume. However, other ratios, functions, or algorithms can be used with the visibility values to adjust the volume levels of the audio objects. In addition, as described above, in some embodiments, the volume level of certain audio objects change at a different rate than other audio objects. In these embodiments, different ratios, functions, or algorithms are used to adjust the volume level of each audio object based on the corresponding visibility values. For example, when the visibility value of the virtual environment decreases 10% (e.g., alpha changes from 1.0 to 0.9), the volume level of prominent audio object(s) (e.g., audio associated with a main character, such as virtual robot 302-a) is reduced by a first amount (e.g., −9 dB), while the volume level of less prominent audio object(s) (e.g., ambient background noise) is reduced by a second, different amount (e.g., −6 dB).

In some embodiments, audio objects associated with virtual environment 300 are mixed with audio from real environment 200. In some embodiments, the mixing is performed using a loudness transfer function (e.g., cross-fade) applied to the audio objects associated with virtual environment 300 and the audio from real environment 200. The loudness transfer function can use various techniques for mixing the audio, such as a "sin-cos law" in which the crossfade center point is −3 dB (i.e., 0.707 linear). In some embodiments, the audio from real environment 200 is detected using microphone(s) 112 of device 100a, and then mixed with the audio objects associated with virtual environment based on the volume level of each respective audio object. In some embodiments, the volume levels of the audio objects and the audio from real environment 200 are associated with the visibility values of the virtual and real environments. Thus, in some embodiments, the values for the loudness transfer function are associated with the visibility values. For example, as the visibility of virtual environment 300 decreases (e.g., alpha changes from 1.0 to 0.9) and visibility of real environment 200 increases (e.g., alpha changes from 0.0 to 0.1), the audio objects associated with virtual environment 300 are cross-faded with the audio from real environment 200 using loudness transfer function values corresponding to the changes in visibility (e.g., volume levels of the audio objects are decreased and mixed with audio from real environment 200 at less than its full volume level). As described above, in some embodiments, the volume levels of certain audio objects (e.g., audio objects associated with prominent characters in the virtual environment 300) change at a different rate than other audio objects (e.g., audio objects associated with ambient background noise of the virtual environment 300). In some embodiments, these different rates of change to the volume levels are applied when mixing the audio objects with the audio from real environment 200.

In some embodiments, other forms of audio transitions are used instead of a cross-fade at the time of the imagery transition. These other audio transitions include a straight cut (e.g., the audio immediately changes without a gradual cross-fade), a pre-lap sound edit (e.g., the audio changes before the imagery of the environment changes), a post-lap sound edit (e.g., the current audio continues for some time after the imagery of the environment changes), or using the same audio across the transition (e.g., music or ambient noise from the virtual environment 300 continues after the imagery changes to the real environment 200).

In some embodiments, the audio transition includes a transition between acoustic properties (e.g., reverberation, decay time (T60), frequency response, time-energy-frequency (TEF), energy time curve (ETC), etc.) of the real environment 200 and virtual environment 300. In some embodiments, acoustic properties of audio objects associated with virtual environment 300 are modified to correspond to the acoustic properties of real environment 200. For example, while in the virtual environment 300, audio objects associated with a virtual avatar (e.g., virtual robot 302-a) include acoustic properties corresponding to the virtual environment 300 (e.g., sounds emitted by virtual robot 302-a are processed to have acoustic properties corresponding to the inside of a spaceship). When the audio transitions to the real environment 200, the acoustic properties of audio objects associated with the virtual avatar are modified to correspond to the acoustic properties of the real environment 200 (e.g., the sounds emitted by virtual robot 302-a are processed to have acoustic properties corresponding to the room of the user). In this way, the audio objects associated with virtual avatar blend more realistically with the audio in the real environment 200 when transitioning from the virtual environment 300 to the real environment 200.

In some embodiments, acoustic properties of audio in real environment 200 are modified to correspond to the acoustic properties of virtual environment 300. For example, while in the real environment 200, the sound of a person speaking in the real environment 200 (e.g., the user's own voice) has acoustic properties corresponding to the real environment (e.g., the sound of the person speaking is not processed and has acoustic properties corresponding to the natural acoustics of the room where the person is speaking). When the audio transitions to the virtual environment 300, the acoustic properties of audio in the real environment (e.g., the sound of the person's voice) are modified to correspond to the acoustic properties of the virtual environment 300 (e.g., the person's voice is processed to have acoustic properties corresponding to the interior of a spaceship). In this way, the audio in the real environment 200 blends more realistically with the audio in the virtual environment 300 when transitioning from the real environment 200 to the virtual environment 300.

In some embodiments, the acoustic properties of the real environment 200 are determined by device 100a. In some embodiments, the acoustic properties of the real environment 200 are predetermined acoustic properties assigned to a type of environment (e.g., large room, small room, concert hall, cathedral). In some embodiments, the acoustic properties of the real environment 200 are determined by analyzing acoustic and/or physical features of the real environment 200. For example, the acoustic properties of the real environment 200 can be determined by emitting a predetermined test sound (e.g., a chirp or sweep) and analyzing the changes to the test sound caused by the real environment 200 (e.g., the test sound reflects off the physical features of the room, and the reflections are analyzed). As another example, the physical features of the room can be detected (e.g., the layout and material composition of the walls, floor, ceiling, and objects in the room). An acoustic model of the real environment 200 can then be estimated based on the physical features of the real environment 200.

In some embodiments, the audio in the real environment 200 is filtered to remove the acoustic properties of the real environment 200 prior to applying the acoustic properties of the virtual environment 300. In some embodiments, the acoustic properties of the real environment 200 are progressively filtered out (e.g., removed gradually) as the acoustic properties of the virtual environment 300 are applied to the audio in the real environment 200. In this way, the audio in the real environment 200 is gradually modified to correspond to the acoustic properties of the audio objects of the virtual environment 300 as the view transitions to the virtual environment 300.

In some embodiments, the acoustic properties applied the audio in the real environment 200 are based in part on the audio output device (e.g., closed-back headphones, open-back headphones, in-ear headphones, extra-aural headphones, or loudspeakers). When using an audio output device that allows audio in the real environment 200 to be heard without substantial distortion or reduction in loudness (e.g., open-back headphones, extra-aural headphones, loudspeakers), the audio in the real environment 200 is not processed (e.g., amplified or filtered) when a view of the real environment 200 is provided. When using an audio output device that causes audio in the real environment 200 to be distorted or reduced in loudness (e.g., closed-back headphones, in-ear headphones), the audio in the real environment 200 is processed (e.g., amplified or filtered) to apply the acoustic properties of the real environment 200 when a view of the real environment 200 is provided. In this way, the distortion and/or reduction in loudness is mitigated (e.g., a user hears the audio in the real environment 200 in a similar way as a user who is not using closed-back or in-ear headphones).

In some examples, the transition to the view of real environment 200 is in response to electronic device 100a detecting a transition event. In some embodiments, detecting the transition event includes receiving a signal from an input device, such as a rotational input mechanism (e.g., a knob) of the electronic device 100a. While displaying virtual environment 300, if rotation of the rotational input mechanism in a first direction is detected, then real environment 200 becomes at least partially visible and virtual environment 300 becomes less visible (e.g., the environments are blended together as described above). The visibility of each environment is associated with an amount of rotation (and/or speed of rotation) of the rotational input mechanism. A larger amount of rotation (and/or faster rotation) results in real environment 200 becoming more visible and virtual environment 300 becoming less visible than a comparatively small amount of rotation (and/or slow rotation) of the rotational input mechanism. In other words, visibility values used for blending the two environments are associated with the amount of rotation (and/or speed of rotation) of the rotational input mechanism. This allows a user to control the visibility of each environment (real and virtual). In some embodiments, rotation of the rotational input mechanism has a non-linear relationship with the visibility values. For example, quickly rotating the rotational input mechanism a half turn results in different visibility values for the environments than slowly rotating the rotational input mechanism a half turn.

In some embodiments, detecting the transition event includes detecting that a proximity of the electronic device 100a (and/or the user) to a physical object (also referred to as a physical element) in real environment 200 is less than a threshold distance (e.g., 1 foot). For example, while displaying virtual environment 300, if the electronic device 100a (and/or the user) approaches table 202-a of real environment 200, real environment 200 becomes at least partially visible and virtual environment 300 becomes less visible (e.g., the environments are blended together as described above). In some examples, visibility of each environment is associated with the proximity of the device 100a (and/or the user) to the physical object (e.g., table 202-a). For instance, as the device 100a (and/or the user) moves closer to the physical object, real environment 200 becomes more visible and virtual environment 300 becomes less visible. This provides the user with an indication or warning before they contact the physical object.

In some embodiments, device 100a detects the proximity of the device 100a and/or the user to a physical object via one or more internal and/or external image sensors. In some embodiments, the threshold distance is predefined (e.g., by an operating system of device 100a or set by a user of device 100a).

In some embodiments, detecting the transition event includes detecting a triggering sound, such as a person speaking or an alert sound (phone call, message, alarm, etc.). For example, while displaying virtual environment 300, if a triggering sound is detected, real environment 200 becomes at least partially visible and virtual environment 300 becomes less visible (e.g., the environments are blended together as described above). By providing an at least partially visible view of real environment 200, the user may identify the source of the triggering sound. In some embodiments, a representation of the source of the triggering sound (e.g., the person speaking, a phone, a computer, etc.) is more visible than other elements of real environment 200.

Figure 4B:
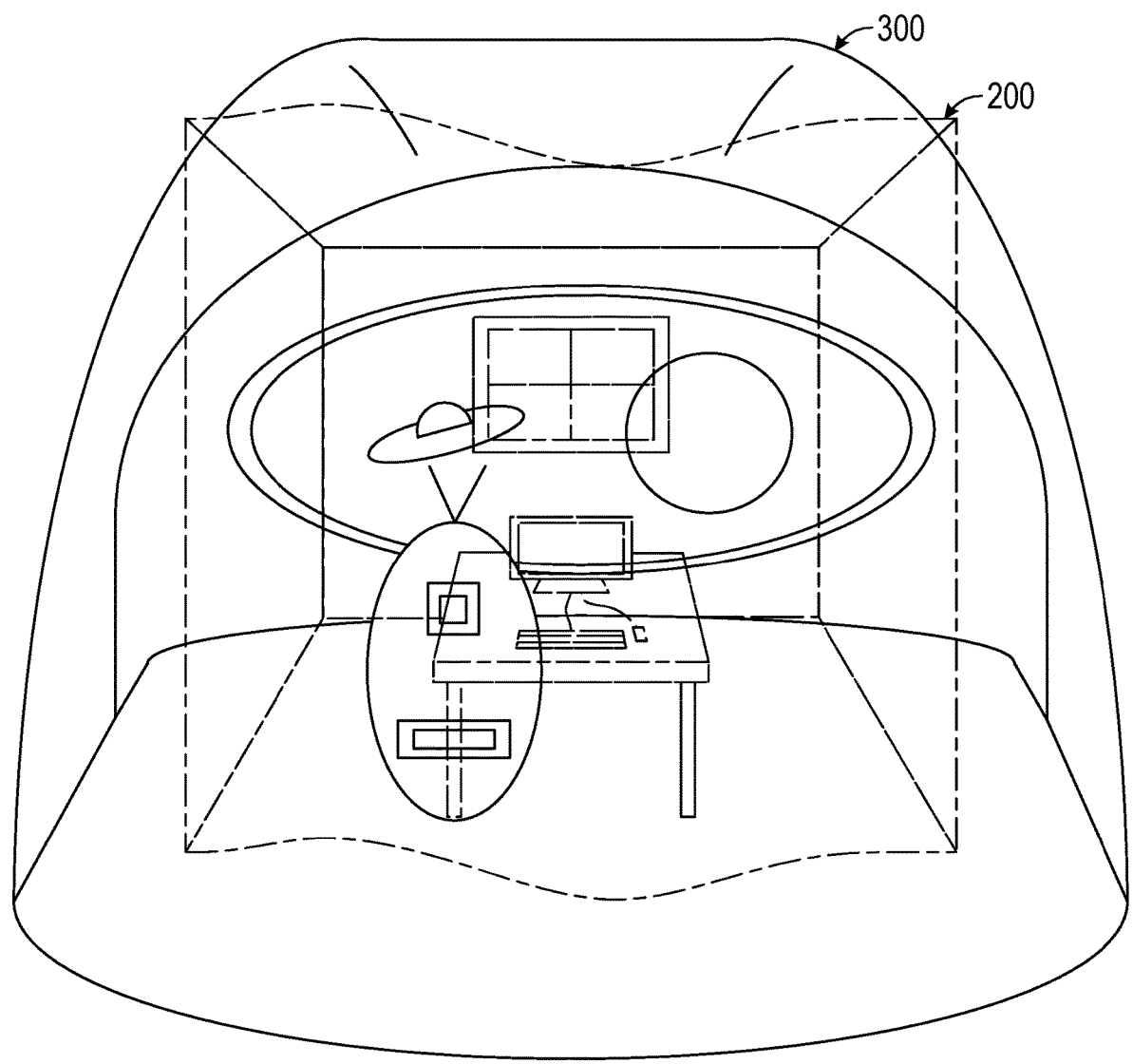

As shown in FIG. 4B, the transition from the view of virtual environment 300 to the view of real environment 200 continues by real environment 200 becoming more visible. In some embodiments, the transition continues in response to further input on the input device, such as the rotational input mechanism. In some embodiments, the transition continues in response to detecting that the proximity of device 100a to the physical object in real environment 200 has decreased. Thus, as the user approaches the physical object, the physical object (and real environment 200)

becomes more visible. In addition, in some embodiments, the volume levels of audio objects associated with virtual environment 300 continue to be reduced, while audio associated with real environment 200 is provided. In some embodiments, the volume level of certain audio objects (e.g., audio objects associated with prominent virtual objects, such as virtual robot 302-*a*) is reduced more quickly than other audio objects (e.g., audio objects associated with ambient background noise of virtual environment 300), or vice versa.

Figure 4C:
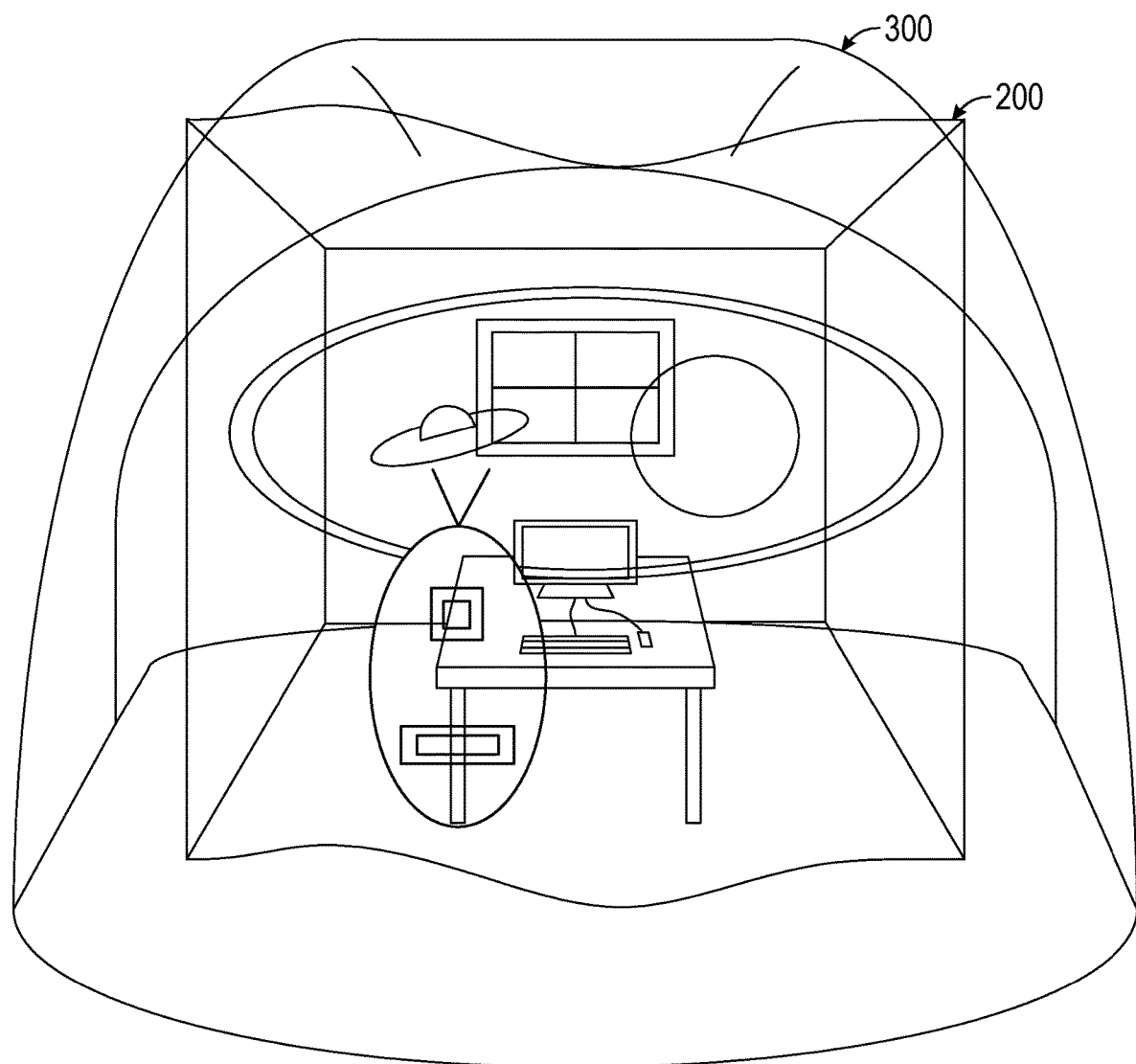

As shown in FIG. 4C, the view of virtual environment 300 has transitioned approximately half way to the view of real environment, such that both environments are approximately equally visible. In addition, in some embodiments, audio objects associated with virtual environment 300 are provided at approximately the same volume levels as audio associated with real environment 200.

Figure 4D:
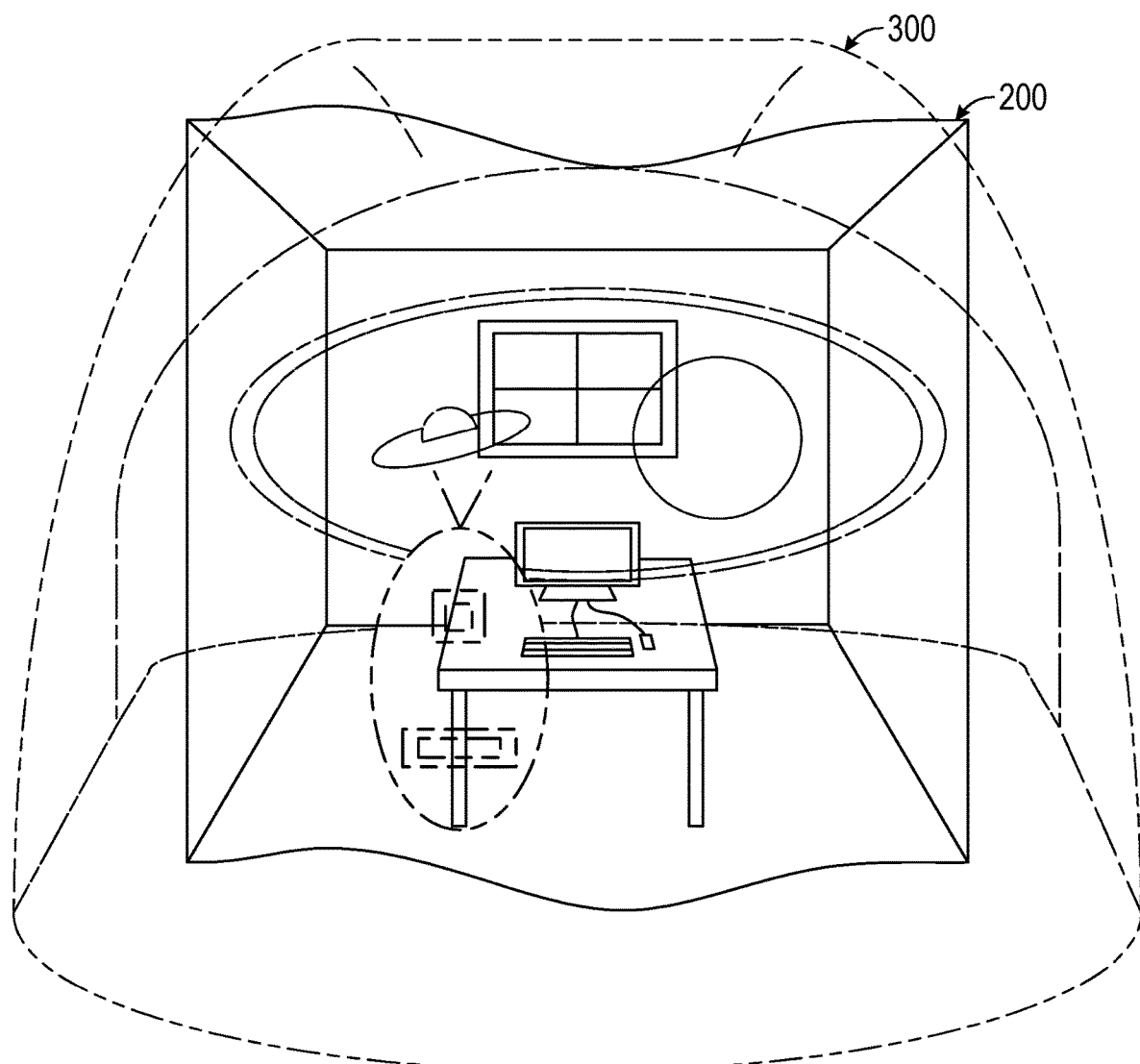

As shown in FIG. 4D, the transition from the view of virtual environment 300 to the view of real environment 200 continues by virtual environment 300 becoming less visible than real environment 200.

Figure 4E:
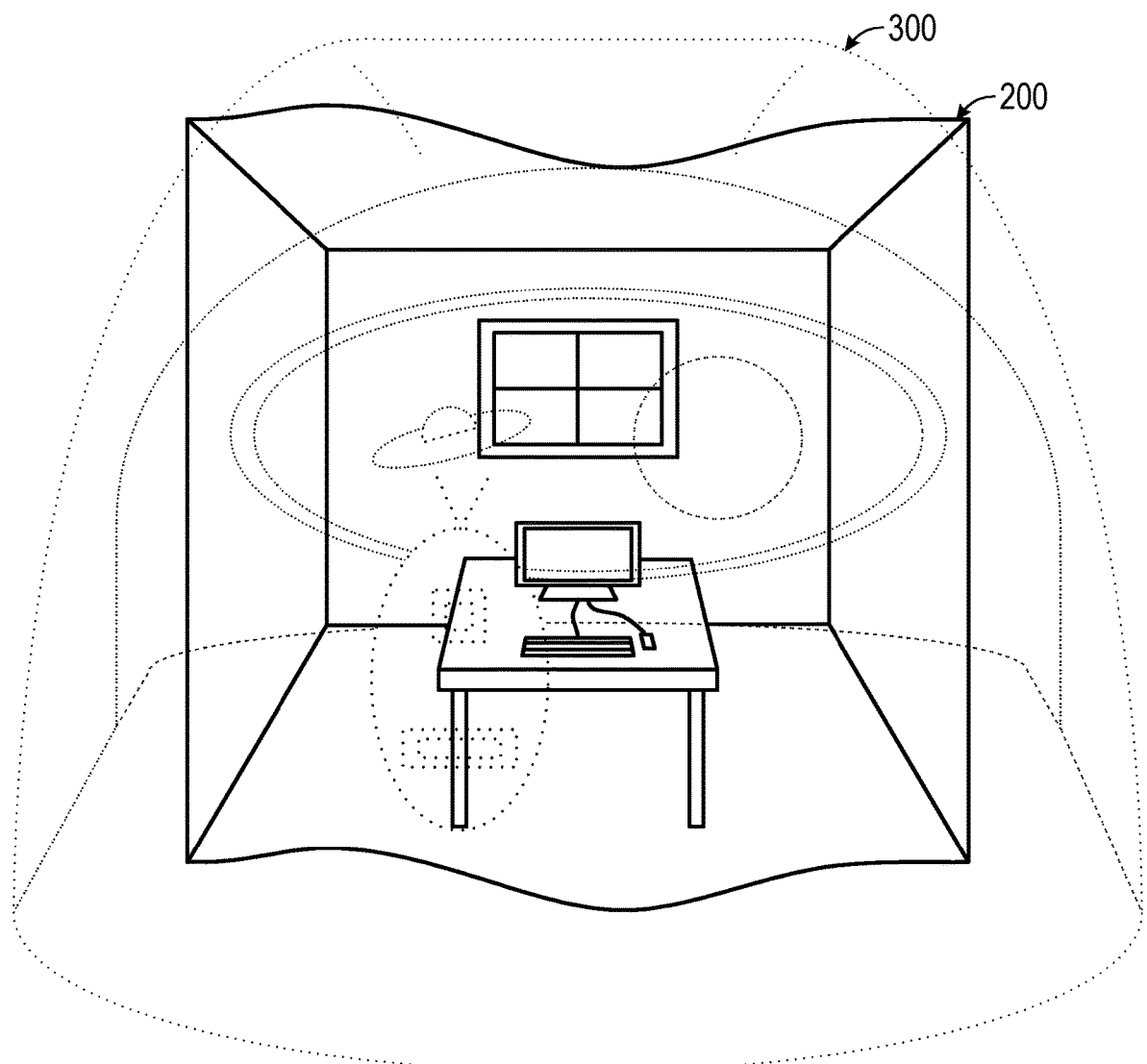

As shown in FIG. 4E, the transition from the view of virtual environment 300 to the view of real environment 200 continues by virtual environment 300 continuing to become less visible than real environment 200.

When the transition is complete, device 100*a* provides a view of real environment 200 as shown in FIG. 2, without providing a view of virtual environment 300.

While providing a view of real environment 200, a substantially opposite process can be performed to transition from the view of real environment 200 to a view of virtual environment 300. This process is performed in response to detecting another transition event. In some embodiments, the transition event includes receiving a signal from an input device (e.g., the rotational input mechanism in an opposite direction) or detecting a proximity of device 100*a* to a physical object is greater than a threshold distance (e.g., 1 foot).

Furthermore, during the transition process, the transition can be reversed so that the view of virtual environment 300 becomes more visible while the view of real environment 200 becomes less visible (or vice versa). The reversal of the transition process is in response to detecting a second transition event. In some embodiments, detecting the second transition event includes receiving a second signal from the input device (e.g., the rotational input mechanism). For example, if a user begins rotating the rotational input mechanism in a first direction which causes a transition from the view of virtual environment 300 to the view of real environment 200, then a rotation of the rotational input mechanism in a second, opposite direction causes the transition to reverse. In some embodiments, the rotation of the rotational input mechanism in the second, opposite direction has a non-linear relationship with the visibility values of the environments. For example, quickly rotating the rotational input mechanism a half turn results in different visibility values for the environments than slowly rotating the rotational input mechanism a half turn.

The reversal of the transition can occur at various times during the transition process. For example, if the transition is partially complete, as shown in FIG. 4B, and a second transition event is detected, the transition process reverses and the view of the real environment becomes less visible, as shown in FIG. 4A.

In some embodiments, detecting the second transition event includes detecting that the proximity of device 100*a* to the physical object has increased. In response to this increase in proximity, the transition process reverses as described above.

This process of transitioning back and forth between views of virtual environment 300 and views of real environment 200 provides a user with visual (and in some embodiments, audible) cues that they approaching an obstacle without fully interrupting the user's experience in the virtual environment 300. By gradually fading in the view of real environment 200, the user may be less disoriented than if virtual environment 300 were suddenly replaced with a view of real environment 200. Then, when the user is no longer near the obstacle, the view of real environment 200 fades out and the user's experience in the virtual environment 300 proceeds more naturally than if than the virtual environment 300 suddenly reappeared.

Figure 5A:
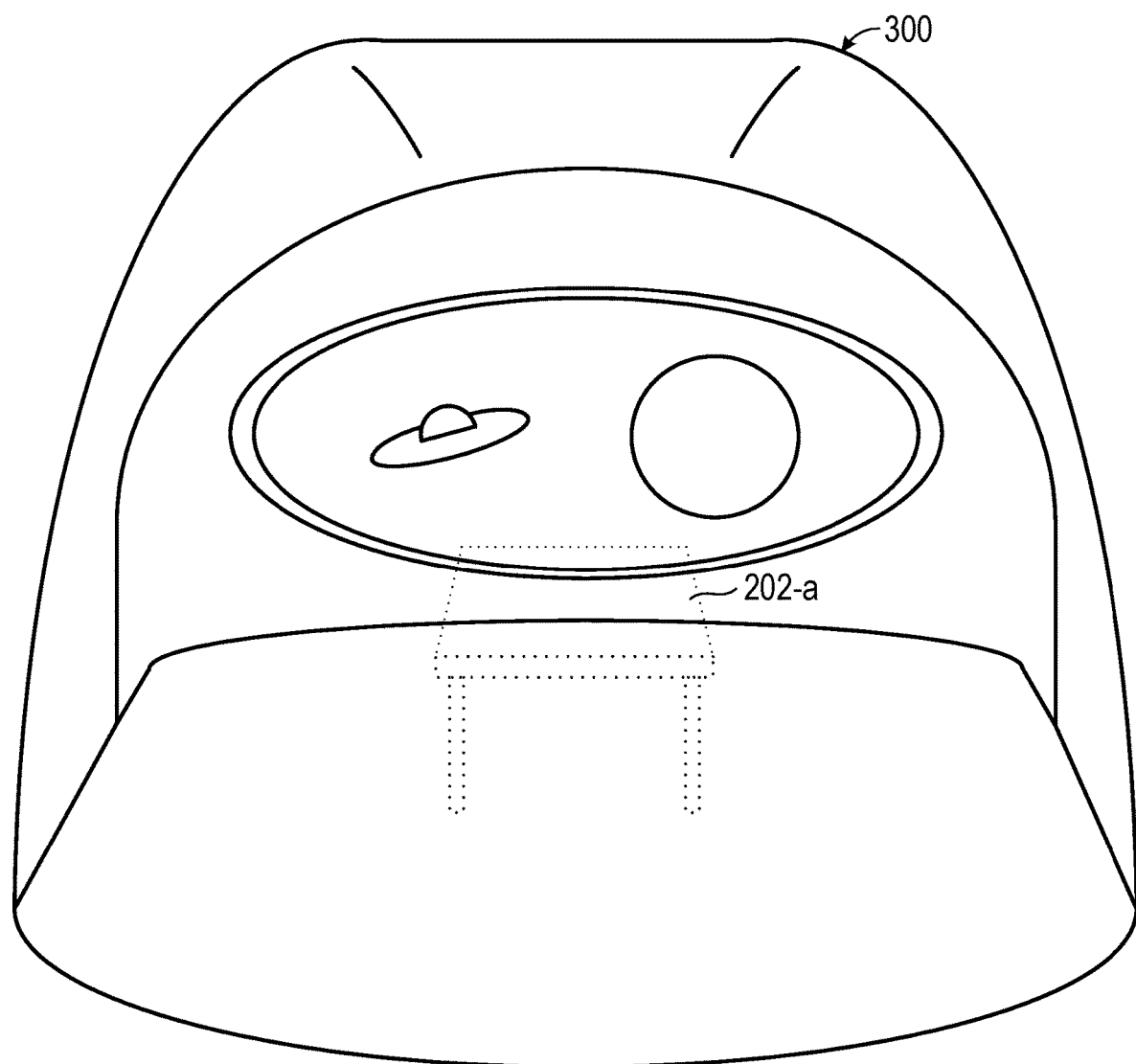
FIGS. 5A-5C illustrate an exemplary technique for inserting imagery from a real environment into a virtual environment, in accordance with some embodiments.
Figure 5B:
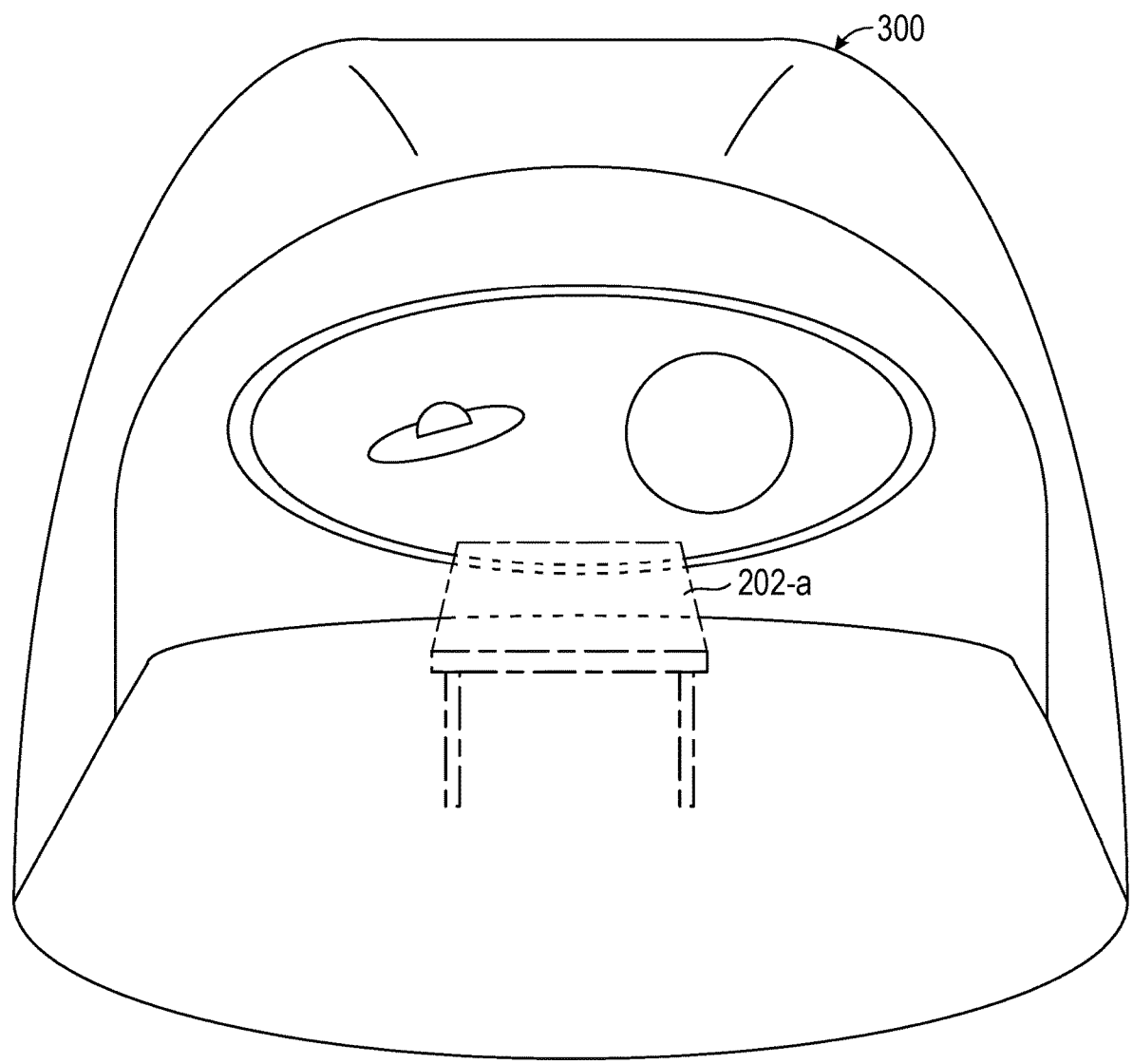
Figure 5C:
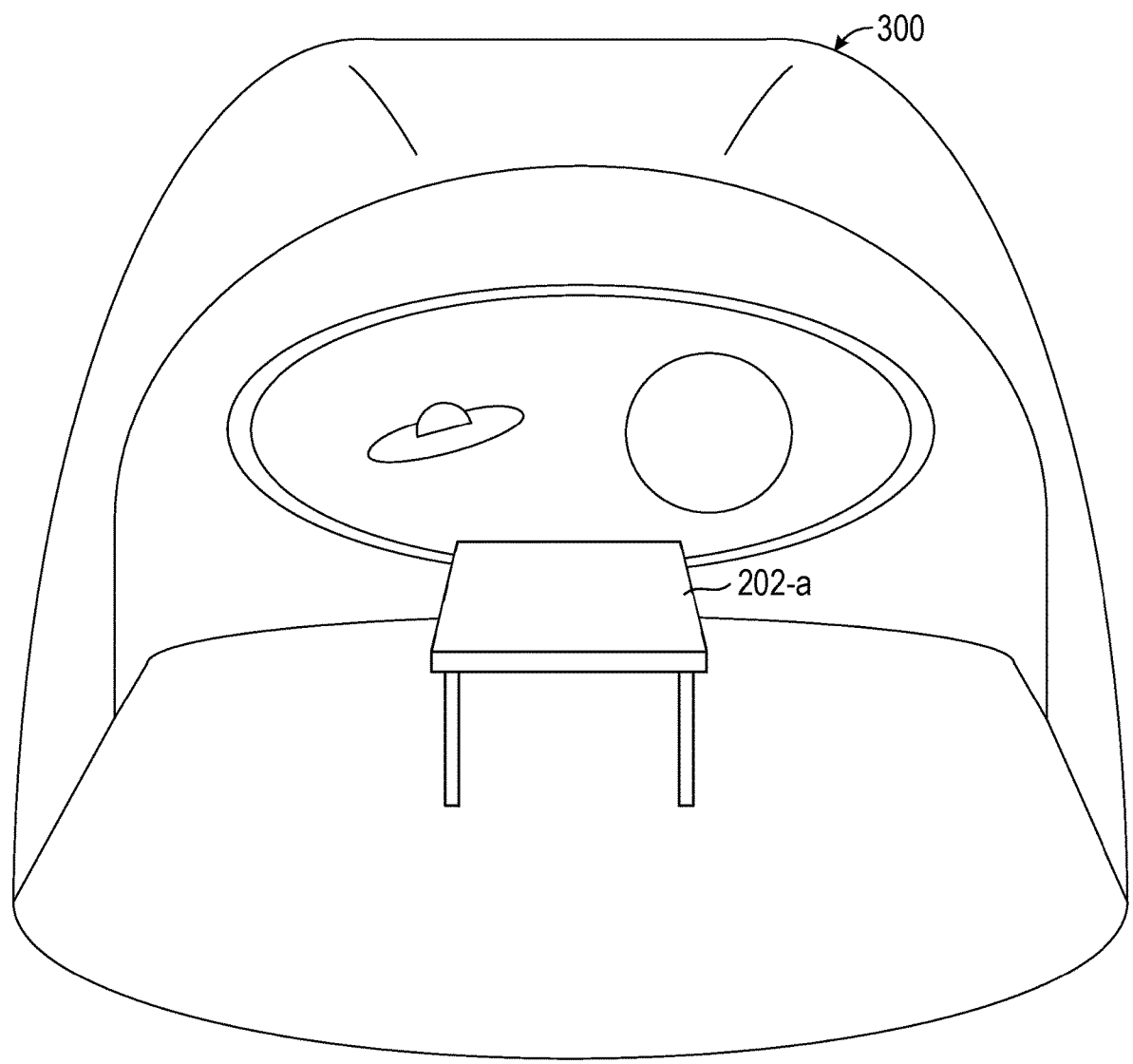

FIGS. 5A-5C illustrate an exemplary technique for inserting imagery from real environment 200 (as described in reference to FIG. 2) into virtual environment 300 (as described in reference to FIG. 3), in accordance with some embodiments. As shown in FIG. 5A, imagery of physical object 202-*a* (also referred to as a physical element) (e.g., a table) is inserted into virtual environment 300. When the imagery of physical object 202-*a* is initially inserted into virtual environment 300, the imagery of physical object 202-*a* is at least partially visible.

The imagery of physical object 202-*a* is inserted in response to detecting that a proximity of the electronic device 100*a* (and/or the user) to the physical object 202-*a* in real environment 200 is less than a threshold distance (e.g., 1 foot). For example, while displaying virtual environment 300, if the electronic device 100*a* approaches physical object 202-*a* in real environment 200, imagery of physical object 202-*a* becomes at least partially visible within virtual environment 300 at a location corresponding to the real-world location of the physical object 202-*a* in real environment 200. In some embodiments, imagery of virtual environment 300 (e.g., at the location corresponding to imagery of physical object 202-*a*) also becomes less visible when the imagery of physical object 202-*a* is inserted.

In some embodiments, device 100*a* detects the proximity of the device 100*a* and/or the user (e.g., arms, legs, or head of the user's body) to the physical object 202-*a* via one or more internal and/or external image sensors. In some embodiments, the threshold distance is predefined (e.g., by an operating system of device 100*a* or set by a user of device 100*a*).

In some embodiments, imagery of physical object 202-*a* is isolated from other imagery of real environment 200. For example, when device 100*a* detects the proximity to the physical object 202-*a* is less than the threshold distance (e.g., 1 foot), imagery of physical object 202-*a* is isolated from the surrounding imagery of real environment 200. The isolated imagery of physical object 202-*a* is then inserted into imagery of virtual environment 300. In some embodiments, the imagery of physical object 202-*a* is detected via one or more sensors (e.g., image sensors) of device 100*a*, for instance, when the physical object 202-*a* is in the field of vision of the one or more sensors of device 100*a*. In some embodiments, the physical object 202-*a* is additionally or alternatively detected via one or more sensors (e.g., image sensors, depth sensors motion sensors, accelerometers, gyroscopes) external to device 100*a* (e.g., sensors installed in real environment 200).

In some embodiments, the imagery of physical object 202-*a* is depicted within virtual environment 300 using a generic object shape (e.g., a generic table, a cube, a sphere, etc). In some embodiments, the generic object shape visually resembles the corresponding physical object 202-*a* in the real environment 200 (e.g., similar size, similar color, etc).

In some embodiments, the imagery of physical object 202-*a* is composited (e.g., blended) with imagery of virtual environment 300. The compositing is performed by using visibility values associated with the imagery of the physical object 202-*a* and the imagery of virtual environment 300 to combine the imageries with each other. In some embodiments, the visibility values correspond to alpha channel information in the imageries. The visibility values are used to adjust the transparency of the imagery of the physical object 202-*a* and the imagery of virtual environment 300. Before inserting, the virtual environment 300 has no transparency (e.g., alpha=1.0). When the imagery of physical object is initially inserted (such as shown in FIG. 5A), the transparency of the virtual environment 300 where the physical object 202-*a* is being inserted is increased slightly (e.g., alpha=0.9), and imagery of physical object 202-*a* is added to the partially transparent imagery of the virtual environment 300, where the imagery of physical object 202-*a* has a complementary visibility value (e.g., alpha=0.1). In some embodiments, the visibility values correspond to alpha channel information of individual pixels of the virtual environment 300 and the imagery of physical object 202-*a*. In this manner, one or more portions of the virtual environment 300 may be displayed at a different transparency than one or more other portions of the virtual environment 300, for instance, before, during, and/or after a transition between views of virtual environment 300 and views of real environment 200.

The visibility of the imagery of physical object 202-*a* is associated with the proximity of the device 100*a* (and/or the user) to the physical object 202-*a*. As the device 100*a* moves closer to the physical object 202-*a* in real environment 200, the imagery of physical object 202-*a* inserted into virtual environment 300 becomes more visible. In some embodiments, imagery of virtual environment 300 also becomes less visible. This provides the user with an indication or warning before they contact the physical object.

As shown in FIG. 5B, the imagery of physical object 202-*a* becomes more visible in virtual environment 300 as the proximity of device 100*a* (and/or the user) decreases. Furthermore, in some embodiments, imagery of virtual environment 300 at the location where the imagery of physical object 202-*a* is inserted becomes less visible. In some embodiments, imagery of all of virtual environment 300 becomes less visible as the imagery of physical object 202-*a* becomes more visible.

As shown in FIG. 5C, the imagery of physical object 202-*a* is fully visible (e.g., alpha=1.0) in virtual environment 300. The imagery of physical object 202-*a* becomes fully visible in response to the proximity of device 100*a* (and/or the user) decreasing to less than a second threshold distance (e.g., 3 inches). Furthermore, in some embodiments, imagery of virtual environment 300 at the location where the imagery of physical object 202-*a* is inserted is no longer visible (e.g., alpha=0.0). In some embodiments, imagery of all of virtual environment 300 is no longer visible such that only the imagery of physical object 202-*a* is visible when the proximity to the physical object 202-*a* decreases to less than the second threshold.

After imagery of physical object 202-*a* is inserted in virtual environment 300, a substantially opposite process can be performed to remove the imagery of physical object 202-*a* from virtual environment 300. This reversal process is in response to detecting the proximity of device 100*a* (and/or the user) to the physical object 202-*a* has increased to more than the threshold distance. This reversal can occur at various times after the imagery of physical object 202-*a* becomes visible in virtual environment 300. For example, if the imagery of physical object 202-*a* is partially visible, as shown in FIG. 5B, and the proximity to the physical object 202-*a* increases, the imagery of physical object 202-*a* becomes less visible, such as shown in FIG. 5A. If the proximity to the physical object 202-*a* continues to increase to greater than the threshold distance, then the imagery of physical object 202-*a* is removed from virtual environment 300, and virtual environment is displayed as shown in FIG. 3.

This process of inserting imagery of physical object 202-*a* in virtual environment 300 provides a user with visual (and in some embodiments, audible) cues that they approaching an obstacle without fully interrupting the user's experience in the virtual environment 300. By inserting imagery of physical object 202-*a* in virtual environment 300 while keeping other aspects of virtual environment 300 intact, the user may be less disoriented than if all aspects of virtual environment 300 were suddenly replaced. Then, when the user is no longer near the obstacle, the imagery of the physical object 202-*a* disappears and the user's experience in the virtual environment 300 proceeds more naturally than if all aspects of virtual environment 300 suddenly reappeared.

Figure 6:
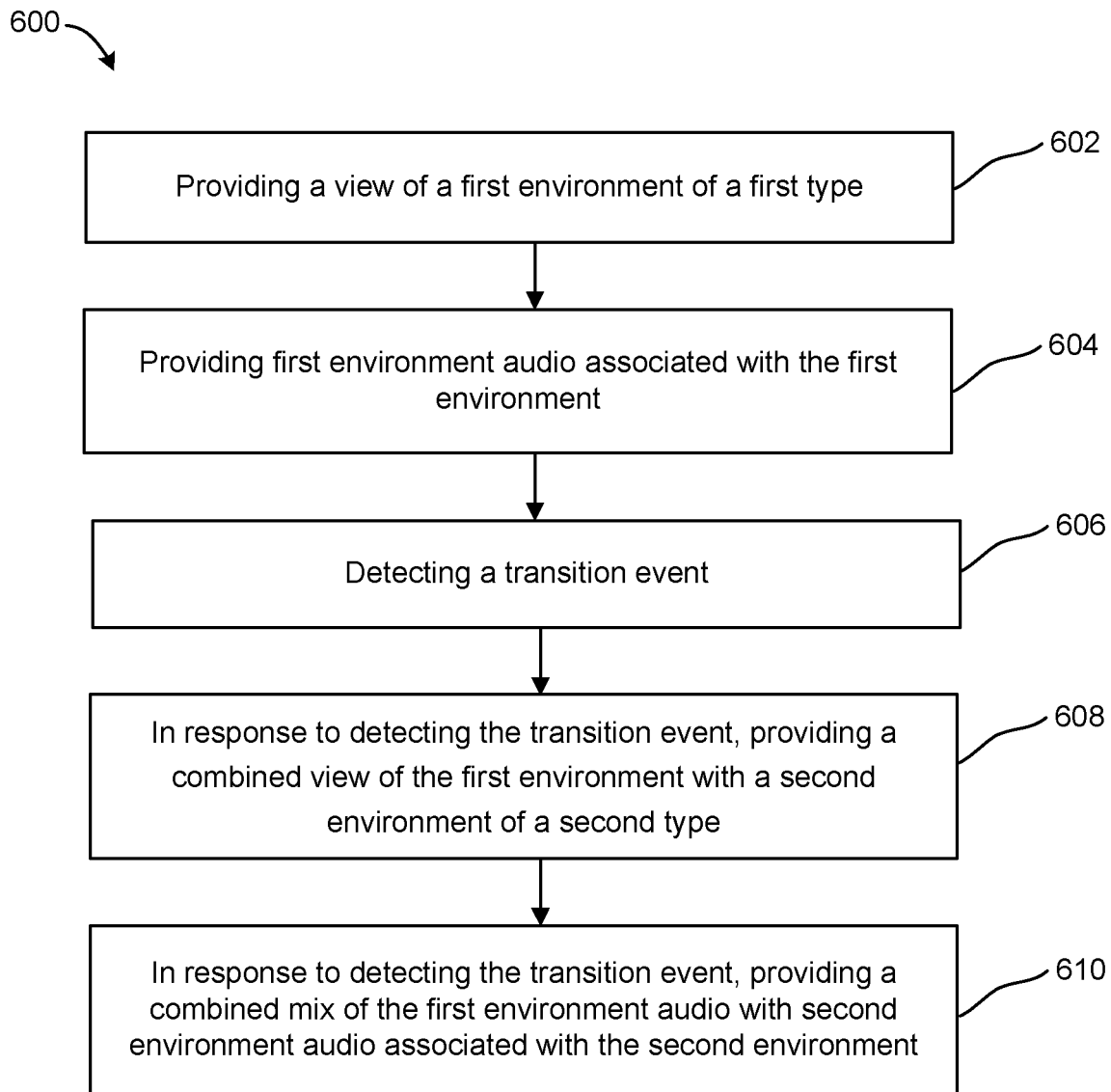
FIG. 6 is a flow diagram illustrating an exemplary process performed by an electronic device, in accordance with some embodiments.

FIG. 6 is a flow diagram illustrating an exemplary process 600 performed by an electronic device (e.g., device 100*a*), in accordance with some embodiments. In some embodiments, the electronic device has one or more display(s) (e.g., display(s) 120). In some embodiments, the display is a (at least partially) transparent display. In some embodiments, the electronic device is connected to and in communication with a display that is separate from the device. In some embodiments, the electronic device has one or more sensor devices (e.g., image sensor(s) 108, orientation sensor(s) 110, location sensor(s) 116). In some embodiments, the electronic device is connected to and in communication with one or more sensor devices (e.g., image sensor(s) 108, orientation sensor(s) 110, location sensor(s) 116) that are separate from the device. In some embodiments, the device is a head-mounted device. In some embodiments, the electronic device is separate from but is secured on (or configured to be secured to) a head-mounted device. In some embodiments, the electronic device includes one or more speakers (e.g., speaker(s) 118) for outputting audio. In some embodiments, the electronic device is connected (or configured to be connected) to (e.g., via wireless connection, via wired connection) and in communication (or configured to be in communication) with one or more speakers (e.g., speaker(s) 118) for outputting audio.

At block 602, a view of a first environment of a first type is provided. In some embodiments, the first environment of the first type is a virtual environment (e.g., virtual environment 300). In some embodiments, the first environment of the first type is a representation of a real environment (e.g., real environment 200). When the view of the first environment is initially provided, the environment is provided at a first visibility value (e.g., alpha=1.0, such as shown in FIG. 3).

At block 604, first environment audio associated with the first environment is provided. In some embodiments, the first environment audio includes one or more audio objects associated with individual components of a virtual environment (such as virtual environment 300, as shown in FIG. 3). Each of the audio objects are mixed together to form the first environment audio. In some embodiments, mixing the audio objects includes adjusting the volume level, spatial placement, and/or frequency spectrum of each audio object such that each audio object is blended into the first environment audio. In some embodiments, the volume level, spatial placement, and/or frequency spectrum of each audio object is adjusted based on the location of an associated virtual object (e.g., virtual object 302) in a virtual environment (e.g., virtual environment 300) and the location and orientation of the user's head relative to the virtual object.

At block 606, a transition event is detected. In some embodiments, detecting the transition event includes receiving a signal from an input device. In some embodiments, the input device comprises a rotational input mechanism (e.g., a knob). In some embodiments, rotation of the rotational input mechanism has a non-linear relationship with the received signal (e.g., quickly rotating the knob results in a different signal than slowly rotating the knob).

In some embodiments, detecting the transition event includes detecting that a proximity of a user to a physical object in a real environment (e.g., table 202-a, as shown in FIG. 2) is less than a threshold distance. In some embodiments, detecting the transition event includes detecting a triggering sound.

At block 608, in response to detecting the transition event, a combined view of the first environment with a second environment of a second type is provided (such as shown in FIGS. 4A-4E). The combined view includes imagery of the first environment at a first visibility value and imagery of the second environment at a second visibility value. In some embodiments, the visibility values correspond to alpha channel information in the imagery of each environment. The visibility values are used to adjust the transparency of each environment. In some embodiments, the first and second visibility values are based on the received signal from the input device. In some embodiments, when detecting the transition event includes detecting that the proximity of the user to a physical object in the real environment is less than a threshold distance, the first visibility value and the second visibility value are based on the proximity of the user to the physical object. In some embodiments, the imagery of the second environment includes a representation of the physical object (e.g., imagery of table 202-a). In some embodiments, when detecting the transition event includes detecting a triggering sound, the imagery of the second environment includes a representation of the source of the triggering sound.

In some embodiments, the second environment of the second type is a representation of a real environment (e.g., real environment 200). In some embodiments, the second environment of the second type is a virtual environment (e.g., virtual environment 300). In some embodiments, providing the combined view includes compositing the imagery of the first environment with the imagery of the second environment. In some embodiments, the compositing uses alpha channels associated with the first environment and the second environment.

At block 610, in response to detecting the transition event, a combined mix of the first environment audio with second environment audio associated with the second environment is provided. At least one of the first environment audio or the second environment audio includes a plurality of audio objects, and volume levels of the plurality of audio objects are associated with at least one of the first visibility value or the second visibility value. In some embodiments, the first environment audio includes the plurality of audio objects, and providing the combined mix includes cross-fading the plurality of audio objects with the second environment audio in accordance with the respective volume levels of the plurality of audio objects. In some embodiments, a volume level of one or more first audio objects of the plurality of audio objects is further associated with a prominence of the one or more first audio objects in the first environment audio (e.g., audio objects associated with a main character of virtual environment 300, such as virtual robot 302-a). In some embodiments, providing the combined view includes aligning a user perspective of the first environment with a user perspective of the second environment.

In some embodiments, after providing the combined view of the first environment with the second environment and the combined mix of the first environment audio with the second environment audio, provision of the combined view of the first environment with the second environment and the combined mix of the first environment audio with the second environment audio is ceased. A view of the second environment and second environment audio are then provided (e.g., a view of real environment 200 is provided, as shown in FIG. 2, with audio from the real environment 200).

In some embodiments, a second transition event is detected (e.g., further rotation of the input mechanism, closer proximity to a physical object). In response to detecting the second transition event, provision of the combined view of the first environment with the second environment and the combined mix of the first environment audio with the second environment audio is ceased. A view of the second environment and second environment audio are then provided (e.g., a view of real environment 200 is provided, as shown in FIG. 2, with audio from the real environment 200).

In some embodiments, in response to detecting the second transition event, the first and second visibility values and the combined mix of the first environment audio with the second environment audio are modified (e.g., the transition from the view of virtual environment 300 to the view of real environment 200 continues, as shown in FIGS. 4B-4E).

In some embodiments, in response to detecting the second transition event, provision of the combined view of the first environment with the second environment and the combined mix of the first environment audio with the second environment audio is ceased. A view of the first environment and first environment audio are then provided (e.g., the view returns to a view of virtual environment 300, as shown in FIG. 3, with audio objects associated with the virtual environment 300).

Figure 7:
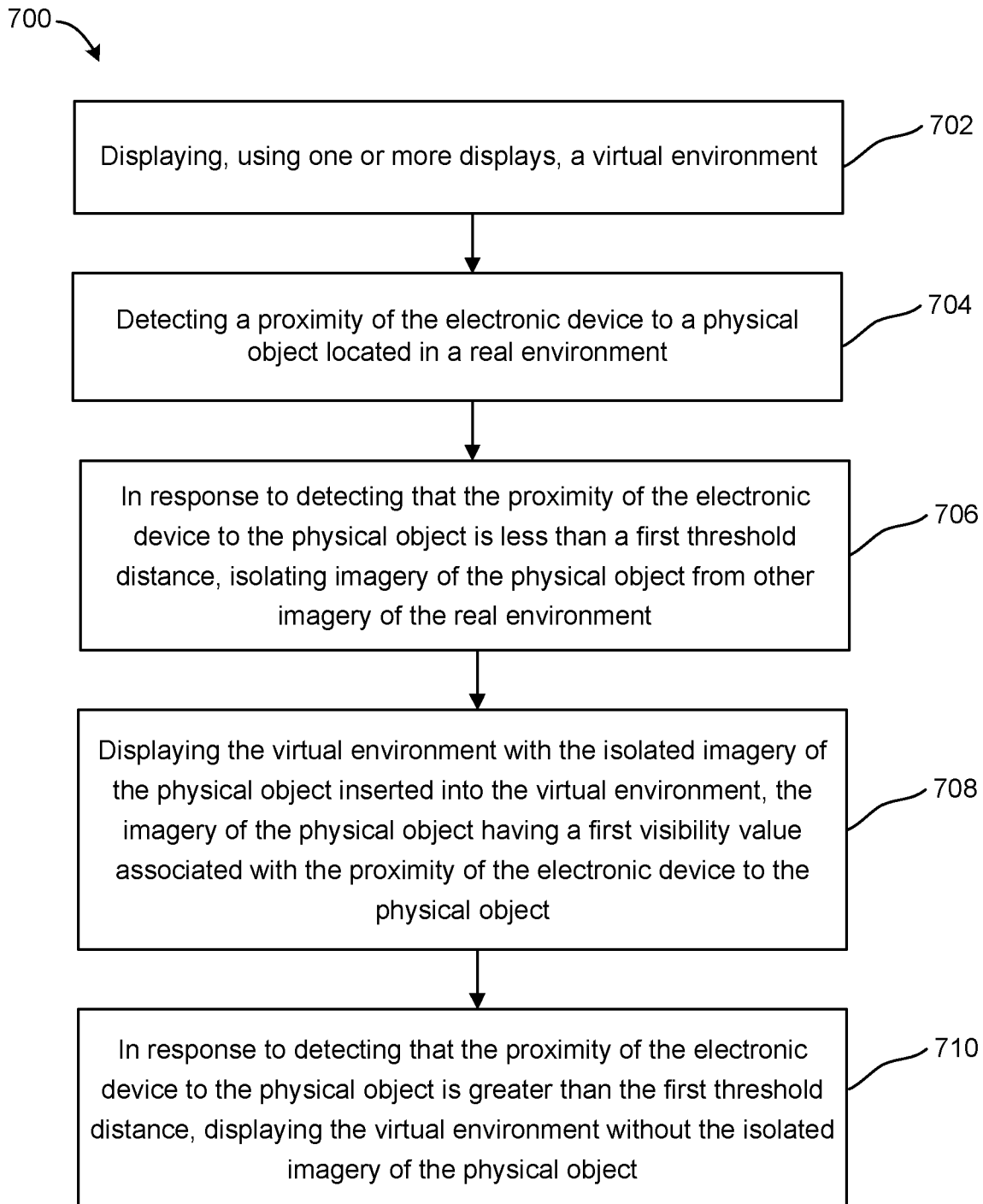
FIG. 7 is a flow diagram illustrating an exemplary process performed by an electronic device, in accordance with some embodiments.

FIG. 7 is a flow diagram illustrating an exemplary process 700 performed by an electronic device (e.g., device 100a), in accordance with some embodiments. In some embodiments, the electronic device has one or more display(s) (e.g., display(s) 120). In some embodiments, the display is a (at least partially) transparent display. In some embodiments, the electronic device is connected to and in communication with a display that is separate from the device. In some embodiments, the electronic device has one or more sensor devices (e.g., image sensor(s) 108, orientation sensor(s) 110, location sensor(s) 116). In some embodiments, the electronic device is connected to and in communication with one or more sensor devices (e.g., image sensor(s) 108, orientation sensor(s) 110, location sensor(s) 116) that are separate from the device. In some embodiments, the device is a head-mounted device. In some embodiments, the electronic device is separate from but is secured on (or configured to be secured to) a head-mounted device. In some embodiments, the electronic device includes one or more speakers (e.g., speaker(s) 118) for outputting audio. In some embodiments, the electronic device is connected (or configured to be connected) to (e.g., via wireless connection, via wired connection) and in communication (or configured to be in communication) with one or more speakers (e.g., speaker(s) 118) for outputting audio.

At block 702, a virtual environment (e.g., virtual environment 300) is presented (e.g., displayed) using one or more displays. When virtual environment is initially presented, the environment is presented at a first visibility value (e.g., alpha=1.0, such as shown in FIG. 3).

At block 704, proximity of the electronic device to a physical object located in a real environment (e.g., physical object 202-a, as shown in FIG. 2) is detected.

At block 706, in response to detecting that the proximity of the electronic device to the physical object is less than a first threshold distance, imagery of the physical object is isolated from other imagery of the real environment.

At block 708, the virtual environment is presented with the isolated imagery of the physical object inserted into the virtual environment at a location corresponding to the location of the physical object in the real environment (such as shown in FIGS. 5A-5C). The imagery of the physical object has a first visibility value associated with the proximity of the electronic device to the physical object (e.g., as the device moves closer to the physical object 202-a in real environment 200, the imagery of physical object 202-a inserted into virtual environment 300 becomes more visible). In some embodiments, presenting the virtual environment with the isolated imagery of the physical object includes compositing imagery of the virtual environment with the isolated imagery of the physical object. In some embodiments, the compositing uses alpha channels associated with the imagery of the virtual environment and the imagery of the physical object. In some embodiments, presenting the virtual environment with the isolated imagery of the physical object includes aligning a user perspective of the physical object with a user perspective of the virtual environment In some embodiments, in response to detecting that the proximity of the electronic device to the physical object is less than the first threshold distance, the virtual environment is presented at a second visibility value associated with the proximity of the electronic device to the physical object (e.g., imagery of virtual environment 300 becomes less visible when the imagery of physical object 202-a is inserted). In some embodiments, in response to detecting that the proximity of the electronic device to the physical object is less than a second threshold distance, the first visibility value of the imagery of the physical object is modified (e.g., the imagery of physical object 202-a becomes more visible as the device moves closer to the object). In some embodiments, in response to detecting that the proximity of the electronic device to the physical object is less than a third threshold distance, the presentation of the virtual environment is ceased and a view of the real environment is provided (e.g., a view of real environment 200 is provided, as shown in FIG. 2).

At block 710, in response to detecting that the proximity of the electronic device to the physical object is greater than the first threshold distance, the virtual environment is presented without the isolated imagery of the physical object (e.g., imagery of physical object 202-a is removed and virtual environment 300 is presented, as shown in FIG. 3).

In some embodiments, process 700 further includes providing, using one or more speakers, virtual environment audio associated with the virtual environment. In some embodiments, in response to detecting that the proximity of the electronic device to the physical object is less than the first threshold distance, a combined mix of the virtual environment audio with real environment audio is provided, where an amount of virtual environment audio in the combined mix is associated with the proximity of the electronic device to the physical object.

In some embodiments, the virtual environment audio includes a plurality of audio objects, and providing the combined mix includes cross-fading the plurality of audio objects with the real environment audio. In some embodiments, an amount of cross-fade applied to one or more first audio objects of the plurality of audio objects is associated with a prominence of the one or more first audio objects in the virtual environment (e.g., audio objects associated with a main character of virtual environment 300, such as virtual robot 302-a). In some embodiments, the amount of cross-fade applied to one or more second audio objects of the plurality of audio objects is associated with values of alpha channels of the imagery.

Figure 8:
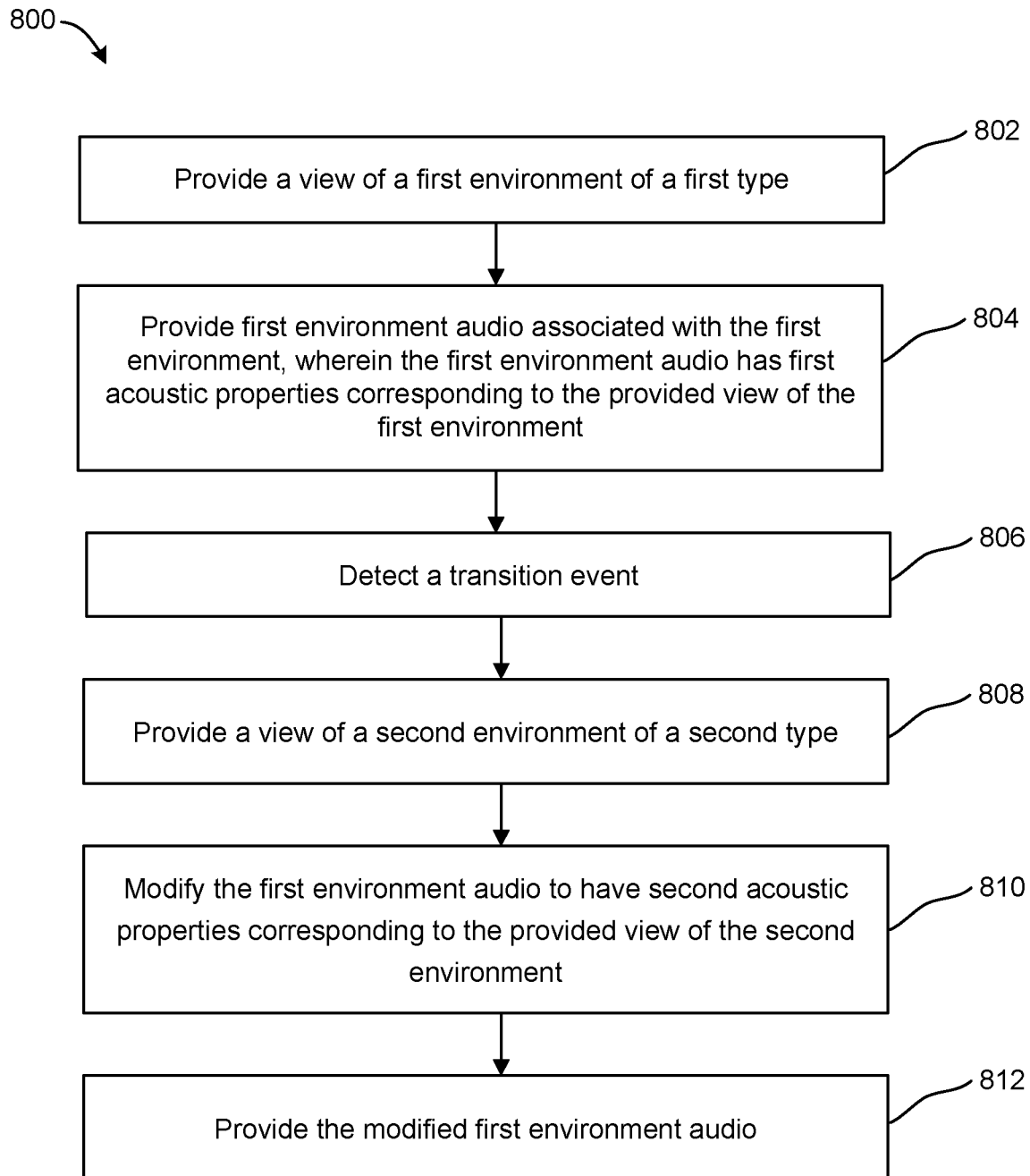
FIG. 8 is a flow diagram illustrating an exemplary process performed by an electronic device, in accordance with some embodiments.

FIG. 8 is a flow diagram illustrating an exemplary process 800 performed by an electronic device (e.g., device 100a), in accordance with some embodiments. In some embodiments, the electronic device has one or more display(s) (e.g., display(s) 120). In some embodiments, the display is a (at least partially) transparent display. In some embodiments, the electronic device is connected to and in communication with a display that is separate from the device. In some embodiments, the electronic device has one or more sensor devices (e.g., image sensor(s) 108, orientation sensor(s) 110, location sensor(s) 116). In some embodiments, the electronic device is connected to and in communication with one or more sensor devices (e.g., image sensor(s) 108, orientation sensor(s) 110, location sensor(s) 116) that are separate from the device. In some embodiments, the device is a head-mounted device. In some embodiments, the electronic device is separate from but is secured on (or configured to be secured to) a head-mounted device. In some embodiments, the electronic device includes one or more speakers (e.g., speaker(s) 118) for outputting audio. In some embodiments, the electronic device is connected (or configured to be connected) to (e.g., via wireless connection, via wired connection) and in communication (or configured to be in communication) with one or more speakers (e.g., speaker(s) 118) for outputting audio.

At block 802, a view of a first environment of a first type is provided (e.g., displayed). In some embodiments, the first environment of the first type is a real environment (e.g., real environment 200). In some embodiments, the first environment of the first type is a virtual environment (e.g., virtual environment 300).

At block 804, first environment audio associated with the first environment is provided, wherein the first environment audio has first acoustic properties corresponding to the provided view of the first environment. In some embodiments, providing the first environment audio includes modifying the first environment audio to have the first acoustic properties corresponding to the provided view of the first environment. In some embodiments, the first environment audio includes a user's voice. In some embodiments, the first environment audio includes an audio object associated with a component of the first environment of the first type.

At block 806, a transition event is detected. In some embodiments, detecting the transition event includes receiving a signal from an input device. In some embodiments, the input device includes a rotational input mechanism (e.g., a knob). In some embodiments, detecting the transition event includes detecting that a proximity of a user to a physical object (e.g., table 202-*a*) in a real environment is less than a threshold distance. In some embodiments, detecting the transition event includes detecting a triggering sound.

At block 808, in response to detecting the transition event, a view of a second environment of a second type is provided. In some embodiments, the second environment of the second type is a virtual environment (e.g., virtual environment 300). In some embodiments, the second environment of the second type is a real environment (e.g., real environment 200).

At block 810, the first environment audio is modified to have second acoustic properties corresponding to the provided view of the second environment. In some embodiments, the acoustic properties include one or more of reverberation, decay time, frequency response, time-energy-frequency, and energy time curve.

At block 812, the modified first environment audio is provided. In some embodiments, the modified first environment audio is provided in a combined mix with second environment audio associated with the second environment. In some embodiments, the second environment audio includes audio modified to have second acoustic properties corresponding to the provided view of the second environment.

In some embodiments, a second transition event is detected. In response to detecting the second transition event, the view of the second environment of the second type ceases to be provided, the first environment audio ceases to be modified to have second acoustic properties, a view of the first environment of the first type is provided, and the first environment audio is provided, wherein the first environment audio has first acoustic properties corresponding to the provided view of the first environment.

Executable instructions for performing the features of processes 600, 700, and 800 described above are, optionally, included in a transitory or non-transitory computer-readable storage medium (e.g., memory(ies) 106) or other computer program product configured for execution by one or more processors (e.g., processor(s) 102).

Various processes defined herein consider the option of obtaining and utilizing a user's personal information. For example, such personal information may be utilized in order to provide imagery and sounds of a real environment in a virtual environment. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   one or more displays;
   one or more processors; and
   memory storing one or more programs configured to be executed by the one or more processors, the one or more programs including instructions for:
      presenting, using the one or more displays, a virtual environment;
      detecting a proximity of the electronic device to a physical object located in a real environment;
      in response to detecting that the proximity of the electronic device to the physical object is less than a first threshold distance:
         isolating imagery of the physical object from other imagery of the real environment; and
         presenting the virtual environment with the isolated imagery of the physical object inserted into the virtual environment at a location corresponding to the location of the physical object in the real environment, the imagery of the physical object having a first visibility value associated with the proximity of the electronic device to the physical object, wherein presenting the virtual environment with the isolated imagery of the physical object includes:
            presenting a first portion of the virtual environment at a first transparency associated with the proximity of the electronic device to the physical object, wherein presenting the first portion of the virtual environment at the first transparency includes combining the first portion of the virtual environment with first imagery of the real environment; and
            presenting a second portion of the virtual environment at a second transparency, different from the first transparency, associated with the proximity of the electronic device to the physical object, wherein presenting the second portion of the virtual environment at the second transparency includes combining the second portion of the virtual environment with second imagery of the real environment; and
      in response to detecting that the proximity of the electronic device to the physical object is greater than the first threshold distance:
         presenting the virtual environment without the isolated imagery of the physical object.

2. The electronic device of claim 1, wherein the one or more programs further include instructions for:
   in response to detecting that the proximity of the electronic device to the physical object is less than a second threshold distance:
      modifying the first visibility value of the imagery of the physical object.

3. The electronic device of claim 1, wherein the one or more programs further include instructions for:

in response to detecting that the proximity of the electronic device to the physical object is less than a third threshold distance:
    ceasing to present the virtual environment; and
    providing a view of the real environment.

4. The electronic device of claim 1, wherein presenting the virtual environment with the isolated imagery of the physical object comprises compositing imagery of the virtual environment with the isolated imagery of the physical object, wherein the compositing uses alpha channels associated with the imagery of the virtual environment and the imagery of the physical object.

5. The electronic device of claim 1, wherein the one or more programs further include instructions for:
    providing, using one or more speakers, virtual environment audio associated with the virtual environment; and
    in response to detecting that the proximity of the electronic device to the physical object is less than the first threshold distance:
        providing a combined mix of the virtual environment audio with real environment audio, wherein an amount of virtual environment audio in the combined mix is associated with the proximity of the electronic device to the physical object.

6. The electronic device of claim 5, wherein the virtual environment audio comprises a plurality of audio objects, and wherein providing the combined mix comprises cross-fading the plurality of audio objects with the real environment audio.

7. The electronic device of claim 6, wherein an amount of cross-fade applied to one or more first audio objects of the plurality of audio objects is associated with a prominence of the one or more first audio objects in the virtual environment.

8. The electronic device of claim 6, wherein:
    presenting the virtual environment with the isolated imagery of the physical object comprises compositing imagery of the virtual environment with the isolated imagery of the physical object using alpha channels associated with the imagery of the virtual environment and the isolated imagery of the physical object, and
    the amount of cross-fade applied to one or more second audio objects of the plurality of audio objects is associated with values of respective alpha channels.

9. The electronic device of claim 1, wherein presenting the virtual environment with the isolated imagery of the physical object includes aligning a user perspective of the physical object with a user perspective of the virtual environment.

10. The electronic device of claim 1, wherein the first portion of the virtual environment corresponds to the location of the physical object in the real environment, and wherein the second portion of the virtual environment corresponds to a location different from the location of the physical object in the real environment.

11. The electronic device of claim 1, wherein the first transparency and the second transparency increase as the proximity of the electronic device to the physical object decreases.

12. A non-transitory computer-readable storage medium storing one or more programs configured to be executed by one or more processors of an electronic device having one or more displays, the one or more programs including instructions for:
    presenting, using the one or more displays, a virtual environment;
    detecting a proximity of the electronic device to a physical object located in a real environment;
    in response to detecting that the proximity of the electronic device to the physical object is less than a first threshold distance:
        isolating imagery of the physical object from other imagery of the real environment; and
        presenting the virtual environment with the isolated imagery of the physical object inserted into the virtual environment at a location corresponding to the location of the physical object in the real environment, the imagery of the physical object having a first visibility value associated with the proximity of the electronic device to the physical object, wherein presenting the virtual environment with the isolated imagery of the physical object includes:
            presenting a first portion of the virtual environment at a first transparency associated with the proximity of the electronic device to the physical object, wherein presenting the first portion of the virtual environment at the first transparency includes combining the first portion of the virtual environment with first imagery of the real environment; and
            presenting a second portion of the virtual environment at a second transparency, different from the first transparency, associated with the proximity of the electronic device to the physical object, wherein presenting the second portion of the virtual environment at the second transparency includes combining the second portion of the virtual environment with second imagery of the real environment; and
    in response to detecting that the proximity of the electronic device to the physical object is greater than the first threshold distance:
        presenting the virtual environment without the isolated imagery of the physical object.

13. The non-transitory computer-readable storage medium of claim 12, wherein the one or more programs further include instructions for:
    in response to detecting that the proximity of the electronic device to the physical object is less than a second threshold distance:
        modifying the first visibility value of the imagery of the physical object.

14. The non-transitory computer-readable storage medium of claim 12, wherein the one or more programs further include instructions for:
    in response to detecting that the proximity of the electronic device to the physical object is less than a third threshold distance:
        ceasing to present the virtual environment; and
        providing a view of the real environment.

15. The non-transitory computer-readable storage medium of claim 12, wherein the one or more programs further include instructions for:
    providing, using one or more speakers, virtual environment audio associated with the virtual environment, wherein the virtual environment audio comprises a plurality of audio objects; and
    in response to detecting that the proximity of the electronic device to the physical object is less than the first threshold distance:
        providing a combined mix of the virtual environment audio with real environment audio, wherein an amount of virtual environment audio in the combined mix is associated with the proximity of the electronic device to the physical object, wherein providing the combined mix comprises cross-fading the plurality of audio objects with the real environment audio.

16. The non-transitory computer-readable storage medium of claim 15, wherein:
presenting the virtual environment with the isolated imagery of the physical object comprises compositing imagery of the virtual environment with the isolated imagery of the physical object using alpha channels associated with the imagery of the virtual environment and the isolated imagery of the physical object, and
the amount of cross-fade applied to one or more second audio objects of the plurality of audio objects is associated with values of respective alpha channels.

17. The non-transitory computer-readable storage medium of claim 12, wherein the first portion of the virtual environment corresponds to the location of the physical object in the real environment, and wherein the second portion of the virtual environment corresponds to a location different from the location of the physical object in the real environment.

18. The non-transitory computer-readable storage medium of claim 12, wherein the first transparency and the second transparency increase as the proximity of the electronic device to the physical object decreases.

19. A method, comprising:
at an electronic device having one or more displays:
presenting, using the one or more displays, a virtual environment;
detecting a proximity of the electronic device to a physical object located in a real environment;
in response to detecting that the proximity of the electronic device to the physical object is less than a first threshold distance:
isolating imagery of the physical object from other imagery of the real environment; and
presenting the virtual environment with the isolated imagery of the physical object inserted into the virtual environment at a location corresponding to the location of the physical object in the real environment, the imagery of the physical object having a first visibility value associated with the proximity of the electronic device to the physical object, wherein presenting the virtual environment with the isolated imagery of the physical object includes:
presenting a first portion of the virtual environment at a first transparency associated with the proximity of the electronic device to the physical object, wherein presenting the first portion of the virtual environment at the first transparency includes combining the first portion of the virtual environment with first imagery of the real environment; and
presenting a second portion of the virtual environment at a second transparency, different from the first transparency, associated with the proximity of the electronic device to the physical object, wherein presenting the second portion of the virtual environment at the second transparency includes combining the second portion of the virtual environment with second imagery of the real environment; and
in response to detecting that the proximity of the electronic device to the physical object is greater than the first threshold distance:
presenting the virtual environment without the isolated imagery of the physical object.

20. The method of claim 19, further comprising:
in response to detecting that the proximity of the electronic device to the physical object is less than a second threshold distance:
modifying the first visibility value of the imagery of the physical object.

21. The method of claim 19, further comprising:
in response to detecting that the proximity of the electronic device to the physical object is less than a third threshold distance:
ceasing to present the virtual environment; and
providing a view of the real environment.

22. The method of claim 19, wherein the first portion of the virtual environment corresponds to the location of the physical object in the real environment, and wherein the second portion of the virtual environment corresponds to a location different from the location of the physical object in the real environment.

23. The method of claim 19, wherein the first transparency and the second transparency increase as the proximity of the electronic device to the physical object decreases.

* * * * *